(12) United States Patent
VanTiem et al.

(10) Patent No.: US 12,038,174 B2
(45) Date of Patent: Jul. 16, 2024

(54) CANDLE BLOWING APPARATUS

(71) Applicant: CLEANER CAKES, L.L.C., Lake Orion, MI (US)

(72) Inventors: Mary Jo VanTiem, Lake Orion, MI (US); Michael Giampetroni, Lake Orion, MI (US)

(*) Notice: Subject to any disclaimer, the term of this patent is extended or adjusted under 35 U.S.C. 154(b) by 433 days.

(21) Appl. No.: 17/495,122

(22) Filed: Oct. 6, 2021

(65) Prior Publication Data

US 2022/0026067 A1    Jan. 27, 2022

Related U.S. Application Data

(63) Continuation-in-part of application No. 16/396,968, filed on Apr. 29, 2019, now abandoned.

(60) Provisional application No. 62/664,316, filed on Apr. 30, 2018.

(51) Int. Cl.
*F23Q 25/00* (2006.01)
*B01D 46/00* (2022.01)
*B01D 46/24* (2006.01)

(52) U.S. Cl.
CPC .......... *F23Q 25/00* (2013.01); *B01D 46/0005* (2013.01); *B01D 46/0028* (2013.01); *B01D 46/2414* (2013.01); *B01D 2275/202* (2013.01); *B01D 2279/65* (2013.01)

(58) Field of Classification Search
CPC ....... F23Q 25/00; A62C 3/008; A62C 3/0207; B01D 46/0005; B01D 46/0028; B01D 46/2414; A47G 21/188
See application file for complete search history.

(56) References Cited

U.S. PATENT DOCUMENTS

| 1,061,302 | A |   | 5/1913  | Lohr |  |
|---|---|---|---|---|---|
| 1,333,011 | A | * | 3/1920  | Crady | B01D 35/00 |
|   |   |   |   |   | 210/314 |
| 4,642,065 | A |   | 2/1987  | Whedon et al. |  |
| 4,995,976 | A |   | 2/1991  | Vermes et al. |  |
| 5,478,467 | A |   | 12/1995 | LeMire et al. |  |
| 8,029,232 | B2 |  | 10/2011 | Wyatt |  |
| 8,820,425 | B2 | * | 9/2014 | Gatling | F23Q 25/00 |
|   |   |   |   |   | 446/209 |

(Continued)

OTHER PUBLICATIONS

Written Opinion of the International Search Authority dated Jul. 3, 2019.

*Primary Examiner* — Christopher R Dandridge
(74) *Attorney, Agent, or Firm* — NEXUS LAW PLLC; Leonard Raykinsteen

(57) ABSTRACT

A candle blowing apparatus may have a main housing, a mouthpiece, at least one filter cartridge, and an ornamental endpiece. The main housing may have a first end and a second end. The mouthpiece may be removably attached to the first end of the main housing. The at least one filter cartridge may include at least one filter. The filter cartridge may be removably disposed within the main housing between the first end and the second end. The filter cartridge may be in fluid communication with the mouthpiece. The ornamental endpiece may be removably attached to the second end of the main housing and be in fluid communication with the filter cartridge. The ornamental endpiece together with the mouthpiece and the filter cartridge may define an air flow path for hygienic delivery of an extinguishing gust of air to a candle.

20 Claims, 15 Drawing Sheets

(56) References Cited

U.S. PATENT DOCUMENTS

| | | |
|---|---|---|
| 2009/0084562 A1 | 4/2009 | Gatling |
| 2011/0048748 A1 | 3/2011 | Gatling et al. |
| 2013/0168112 A1 | 7/2013 | Brown et al. |
| 2014/0065924 A1 | 3/2014 | Dillon |
| 2016/0223199 A1 | 8/2016 | Morris |
| 2017/0191663 A1 | 7/2017 | Morales |
| 2018/0028005 A1* | 2/2018 | Wang-Wu .......... A47G 19/2266 |

* cited by examiner

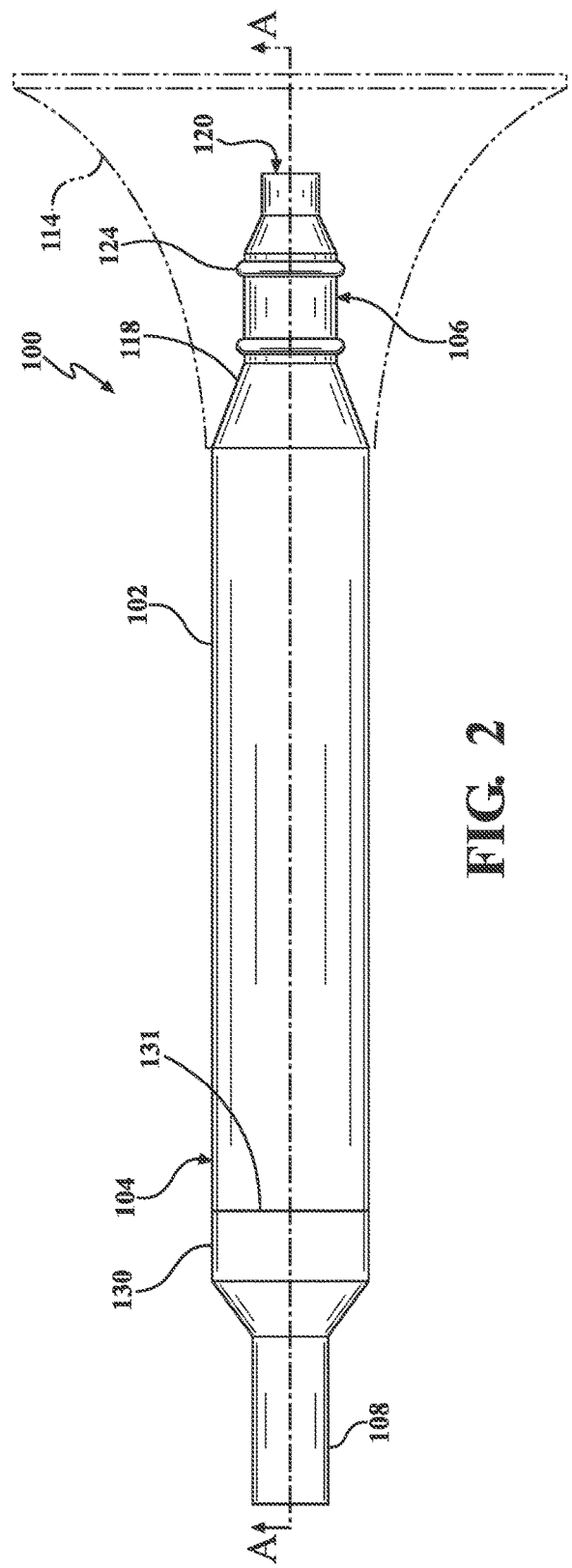
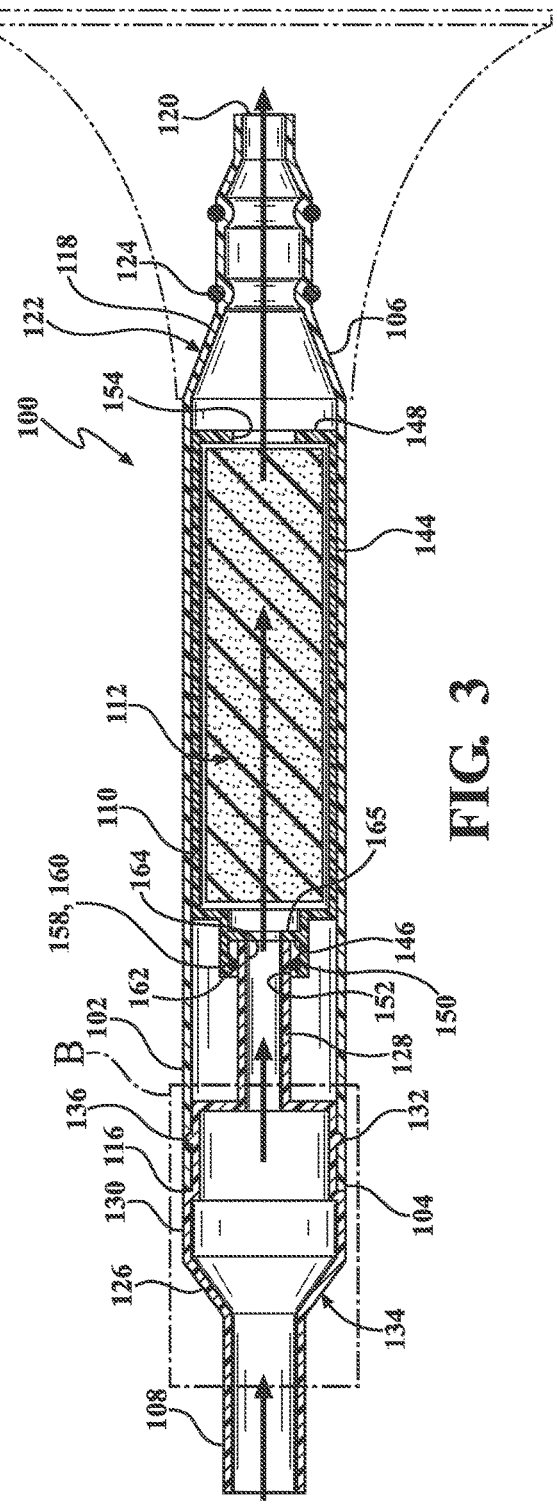

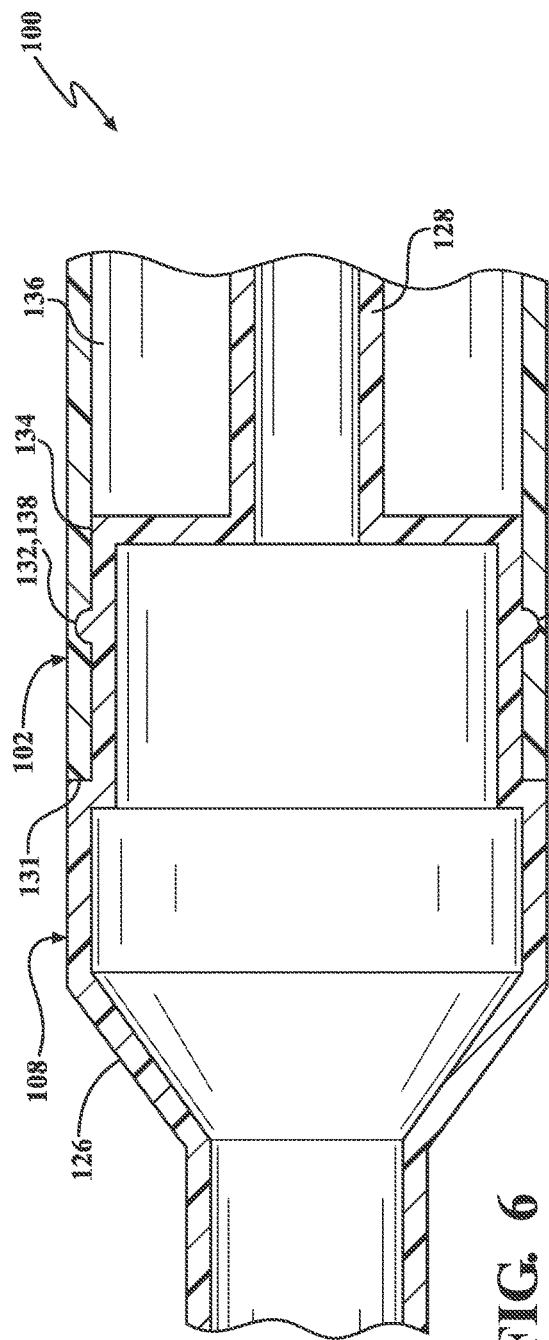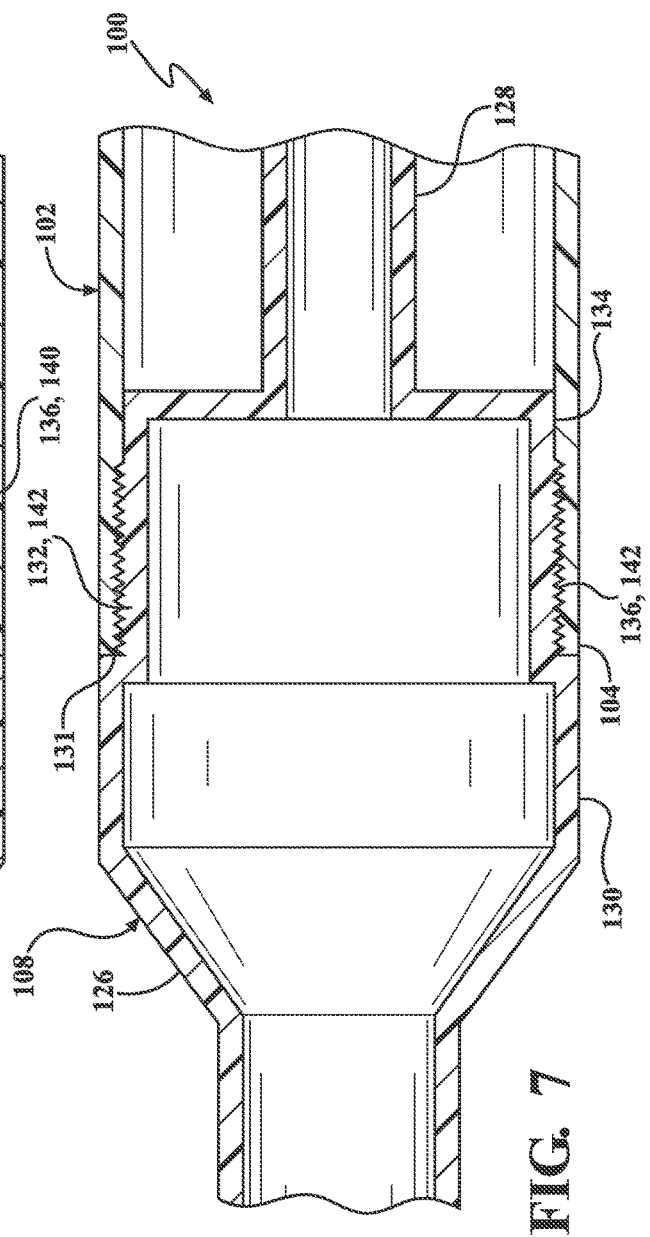

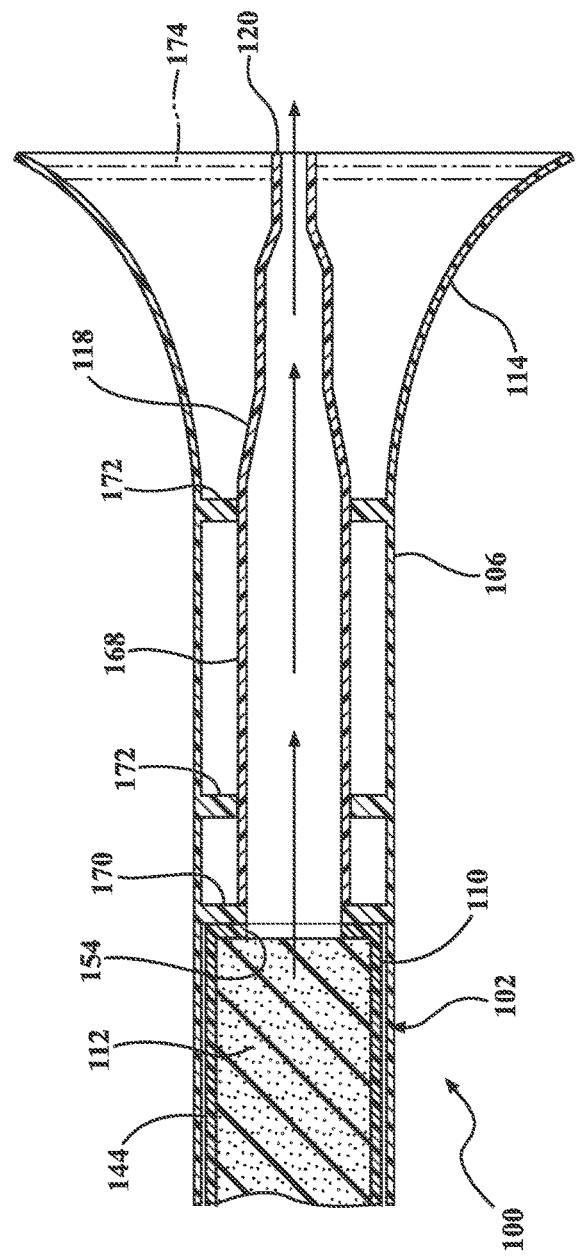
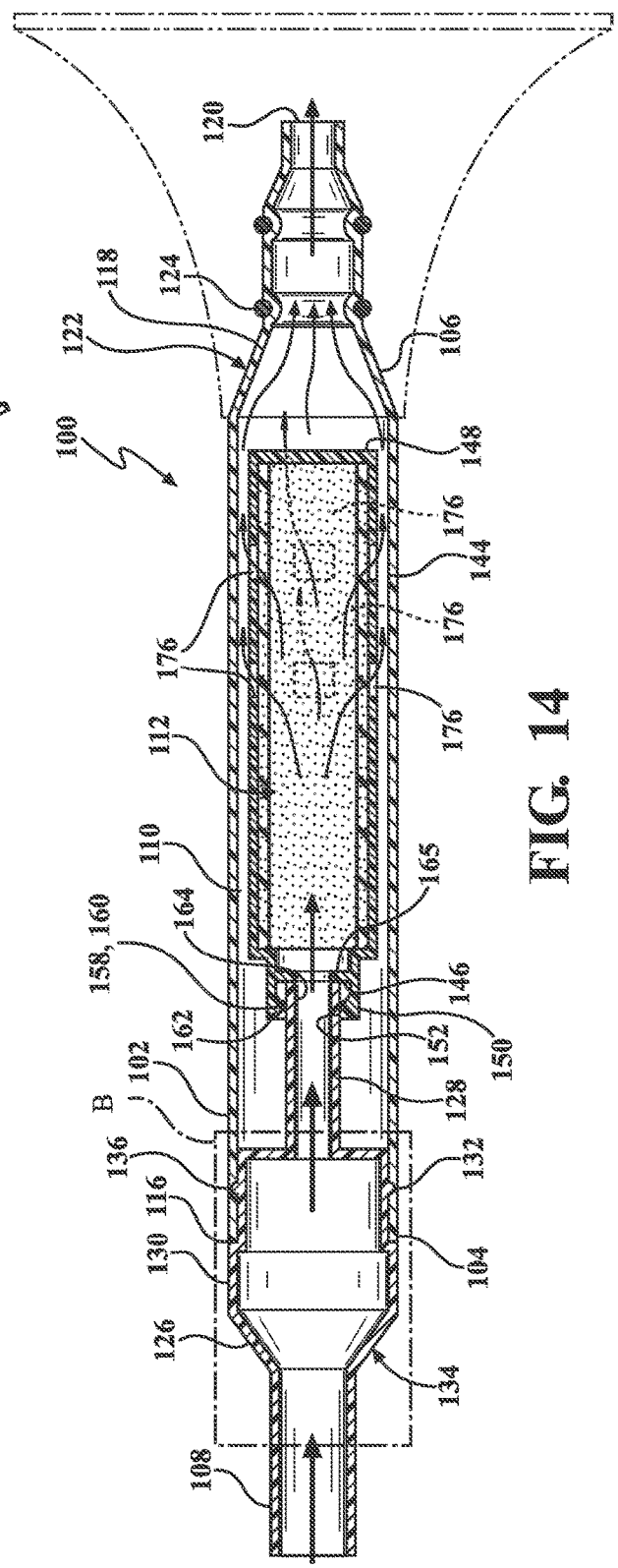

CANDLE BLOWING APPARATUS

CROSS-REFERENCE TO RELATED APPLICATIONS

This application is a continuation-in-part of U.S. patent application Ser. No. 16/396,968, filed on Apr. 29, 2019, which in turn claims the benefit of U.S. Provisional Application No. 62/664,316, filed on Apr. 30, 2018. The entire disclosures of the above applications are incorporated herein by reference.

FIELD

The present disclosure relates to candle blowing devices and, more particularly, to a candle blowing device that minimizes the spreading of germs and pathogens when blowing out candles.

BACKGROUND

Holidays, especially birthdays, are often celebrated with cake. These cakes are often adorned with candles and blown out to commemorate the holiday. However, there is growing concern about the health risks associated with this traditional practice of blowing out candles at birthdays and celebrations. Studies have shown that the simple act of blowing out celebratory or birthday candles increases the level of bacteria on the cake frosting by 1400% and above. These concerns are further exacerbated if the person is sick or unaware they are sick.

Currently, there are few viable solutions available to militate against spreading of germs onto cakes with candles. Known solutions include preventative measures such as consumers opting to not blow out candles, use of cupcakes instead of a whole cake, or scraping frosting off the cake. These methods will stop or prevent the spread of germs, but are also inconsistent with the celebratory or birthday tradition and are therefore generally undesirable.

There is a continuing need for a candle blowing apparatus that filters air blown at candles. Desirably, the candles blowing apparatus will feature a removable filter cartridge to allow for repeated hygienic uses of the same apparatus.

SUMMARY

In concordance with the instant disclosure, a candle blowing apparatus that filters air blown at candles, and which features a removable filter cartridge to allow for repeated hygienic uses of the same apparatus, has been surprisingly discovered.

In one embodiment, a candle blowing apparatus may have a main housing with a first end and a second end. A mouthpiece may be removably attached to the first end of the main housing. The candle blowing apparatus also includes at least one filter cartridge with at least one filter. The filter cartridge may be removably disposed within the main housing between the first end and the second end. The filter cartridge may be in fluid communication with the mouthpiece. An ornamental endpiece may be removably attached to the second end of the main housing and be in fluid communication with the filter cartridge. The ornamental endpiece, together with the mouthpiece and the filter cartridge, may define an air flow path for delivery of an extinguishing gust of air to a candle in operation.

In another embodiment, a kit for a candle blowing apparatus may include a main housing, a mouthpiece, at least one filter cartridge, and an ornamental endpiece, all provided separately or initially unconnected to one another, for example, in a package. The main housing may have a first end and a second end. The mouthpiece may be configured to be removably attached to the first end of the main housing. The at least one filter cartridge may include at least one filter. The filter cartridge may be configured to be removably disposed within the main housing between the first end and the second end. The filter cartridge may be configured to be in fluid communication with the mouthpiece. The ornamental endpiece may be configured to be removably attached to the second end of the main housing and configured to be in fluid communication with the filter cartridge. The ornamental endpiece, together with the mouthpiece and the filter cartridge, may be configured to define an air flow path for delivery of an extinguishing gust of air to a candle upon assembly and in operation. The kit may further include a plurality of the filter cartridges, to permit for the repeated hygienic use of the same kit over time.

In a further embodiment, a method of using a candle blowing apparatus includes the steps of providing the kit for a candle blowing apparatus. The kit may include the following separate components: the main housing, the mouthpiece, the at least one filter cartridge including at least one filter, and the ornamental endpiece. The method also includes a second step of connecting the mouthpiece and at least one filter cartridge. The mouthpiece and the at least one filter cartridge are then inserted into the main housing, and the ornamental endpiece is disposed on the main housing, in a third step of the method. The method has a further step of securing the mouthpiece to the main housing via connecting means. The method further includes a step or orienting the assembled candle blowing apparatus toward the candle to be extinguished. A final step of the method may include blowing the extinguishing gust of air toward the candle by the user blowing air into the mouthpiece of the assembled apparatus.

In an exemplary embodiment, a candle blowing apparatus may have the main housing, an air outlet endpiece, an air inlet mouthpiece, and the removable filter cartridge. In particular, the disclosure contemplates the use of forced filtered air rather than one's unfiltered breath to extinguish candles, thereby militating against the spread of germs and pathogens. The air can be blown from the inlet mouthpiece, through the removable filter cartridge that is coupled to the main housing, and out through the air outlet piece.

The candle blowing apparatus may, in certain embodiments, include an air inlet mouthpiece that is removably coupled to the filter cartridge. The main housing is removably coupled to both an air outlet piece and a filter cartridge. The filter cartridge may be formed from multiple components, including at least one filter inside of a filter cartridge sheath, as described and shown further herein.

The candle blowing apparatus may, in certain embodiments, include a filter cartridge that utilizes at least one filter, where the filter cartridge functions to force air through the filters within the cartridge. In other embodiments, the filter cartridge includes two or more filters. The removable filter cartridge may also include O-rings, fixed baffle integral seals, and baffle walls for diverting air through the filters from the inlet to the outlet. The O-ring or seal and the baffles may be separately provided or fixedly connected to the filter cartridge.

As a non-limiting example, the filter may be N95 filter material. In another embodiment, the filter cartridge may contain at least one filter chamber, or a series or chambers in sequence, instead of O-rings (or integral seals) and baffles. Other types of filter materials such as N99, P100 and some antiseptic filter materials, as non-limiting examples, are also contemplated and may be used.

The air inlet mouthpiece may be removably coupled to the filter cartridge. The mouthpiece may also be a variety of shapes including a mostly tubular shape, or a tapered shape. One of ordinary skill in the art may select other shapes for the mouthpiece, as desired.

The air outlet may be removably coupled to the main housing unit. The outlet may be a variety of shapes. The filter cartridge may also include a round mesh type screen, which is positioned in the path of airflow before the air outlet. The outlet may also be any endpiece configured to be removably coupled with the main housing unit. As a non-limiting example, the outlet could be a horn or a cartoon character's head. The endpiece may be held in place by a press- or friction-fit, for example; although, other means of securing the endpiece to the main body may also be used. It should be appreciated that a skilled artisan may select any other suitable shape or removable body for the outlet within the scope of the present disclosure.

It should also be appreciated that the filter cartridge or filter may have one or more screens. These additional screens may be fixed in the path of airflow at any point in the at least one filter or the filter cartridge, as desired.

The filter cartridge sheath is configured to be removably coupled to all other elements of the candle blowing apparatus. It is a cylindrical and hollow tube configured be received in an outermost container in the form of the main housing. The filter cartridge sheath may also have air ports on either end.

Although the apparatus is shown in the drawings being either tube-shaped or generally round in cross-sectional shape, it should be appreciated that any other suitable shapes including rectilinear cross-sectional shapes may also be used.

DRAWINGS

The drawings described herein are for illustration purposes only and are not intended to limit the scope of the present disclosure in any way.

FIG. 2 is a side elevational view of the candle blowing apparatus shown in FIG. 1, with an ornamental endpiece shown in phantom lines to illustrate the underlying end of a main housing;

FIG. 3 is a cross-sectional, side elevational view of the candle blowing apparatus taken at section line A-A in FIG. 2, and showing a path of airflow through the apparatus by arrows;

FIG. 6 is an enlarged, cross-sectional, fragmentary, side elevational view illustrating a connection of a mouthpiece and a main body of the candle blowing apparatus taken at call out B in FIG. 3, according to one embodiment of the disclosure and showing an annular bead received by an annular groove for selectively holding a mouthpiece to the main housing;

FIG. 7 is an is an enlarged, cross-sectional, fragmentary, side elevational view illustrating the connection of the mouthpiece and the main body of the candle blowing apparatus taken at call out B in FIG. 3, according to another embodiment of the disclosure and showing a threaded cooperation for selectively holding a mouthpiece to the main housing;

FIG. 13 is a fragmentary, cross-sectional, side elevational view of the candle blowing apparatus according to another embodiment of the present disclosure, and showing an endpiece integrally formed with the main housing;

FIG. 14 is a cross-sectional, side elevational view of the candle blowing apparatus according to yet another embodiment of the present disclosure, and showing a hollow filter with port holes for air flow through the filter cartridge, with the path of airflow through the apparatus further shown by arrows;

DETAILED DESCRIPTION

Figure 1:
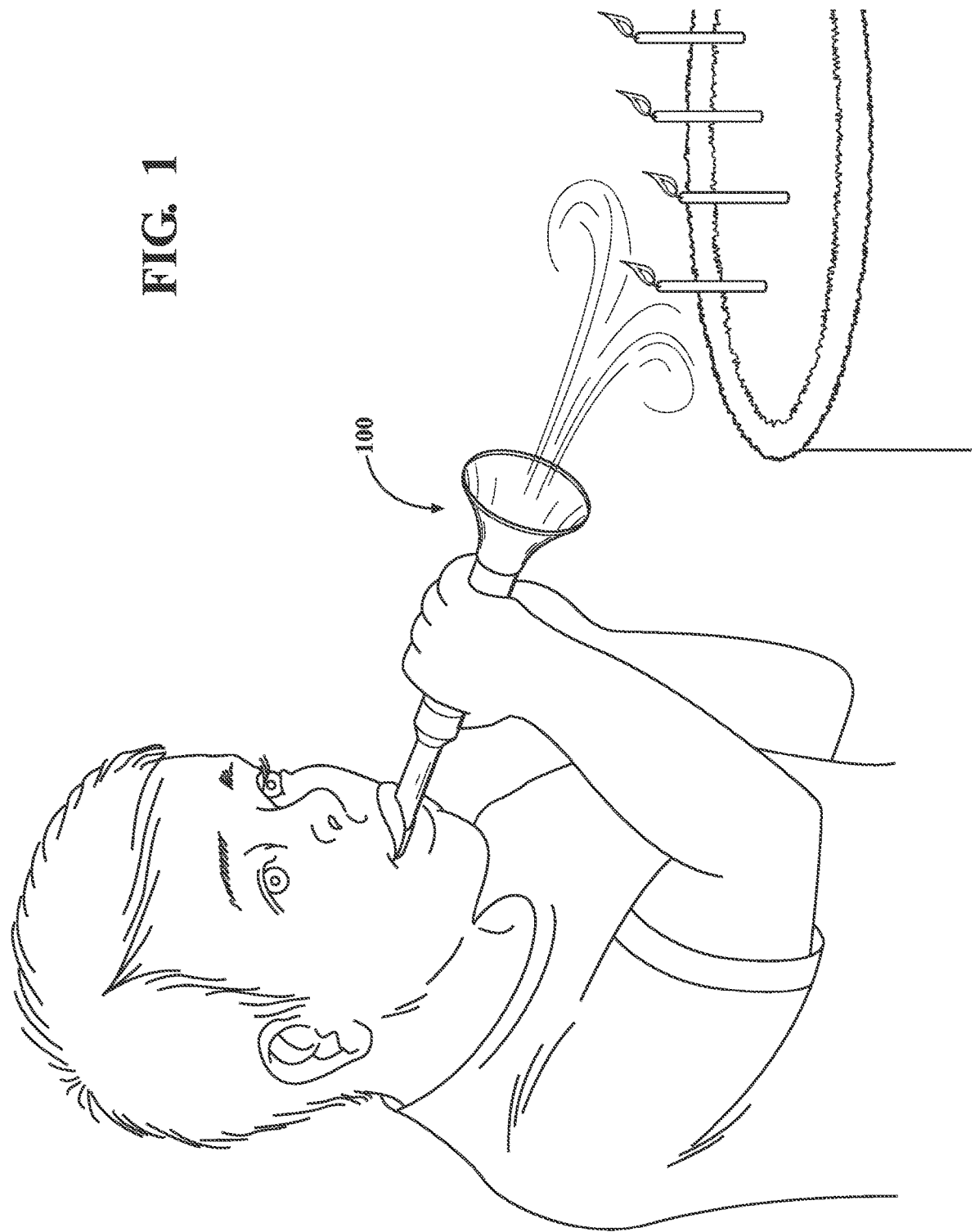
FIG. 1 is a perspective view of a child using a candle blowing apparatus according to one embodiment of the present disclosure.

The following detailed description and appended drawings describe and illustrate various exemplary embodiments of the disclosure. The description and drawings serve to enable one skilled in the art to make and use the disclosure and are not intended to limit the scope of the disclosure in any manner. In respect of the methods disclosed, the steps presented are exemplary in nature, and thus, the order of the steps is not necessary or critical unless otherwise disclosed.

As shown in FIGS. 1-10 and 15-23, a candle blowing apparatus 100 may have a main housing 102. The main housing 102 may have a first end 104 and a second end 106. The candle blowing apparatus 100 may also have a mouthpiece 108. The mouthpiece 108 may be removably attached to the first end 104 of the main housing 102.

The candle blowing apparatus 100 may further have a filter cartridge 110. The filter cartridge may have at least one filter 112. The filter cartridge 110 may be removably disposed within the main housing 102 between the first end 104 and the second end 106. The filter cartridge 110 may be in fluid communication with the mouthpiece 108.

The candle blowing apparatus 100 may have an ornamental endpiece 114. The ornamental endpiece 114 may be removably attached to the second end 106 of the main housing 102. The ornamental endpiece 114 may be in fluid communication with the filter cartridge 110.

It should be understood that the main housing 102, together with the mouthpiece 108 and the filter cartridge 110, defines an air flow path for delivery of an extinguishing gust of air to a candle. Advantageously, the candle blowing apparatus 100 allows a user to extinguish the candle while militating against the spread of germs and bacteria from the user's mouth to a cake or the surrounding environment.

The various components of the candle blowing apparatus 100 may be fabricated from a variety of materials including, but not limited to, plastic, metal, or any other suitably rigid material. The main housing 102 of the candle blowing apparatus 100 may be mostly tube shaped, for example. Although the main housing 102 of the candle blowing apparatus 100 is shown in the drawings being either tube-shaped, or otherwise generally round in cross-sectional shape, it should be appreciated that any other suitable shapes including rectilinear cross-sectional shapes may also be used.

The main housing 102 of the candle blowing apparatus 100 may also include structural bracings (not shown). Advantageously, any such bracing may provide desirably rigidity to the candle blowing apparatus 100. A skilled artisan may select any suitable construction material, shape, and structure for the main housing 102 of the candle blowing apparatus 100, as desired.

As illustrated in FIGS. 2-5, the first end 104 of the main housing 102 may have an aperture 116 formed therein. The aperture 116 may receive the filter cartridge 110. The second end 106 of the main housing 102 may have a tapered portion 118 and an air outlet 120. The air outlet 120 may allow air to exit the main housing 102, in operation. The tapered portion 118 may be adapted to receive the ornamental endpiece 114.

Figure 5:
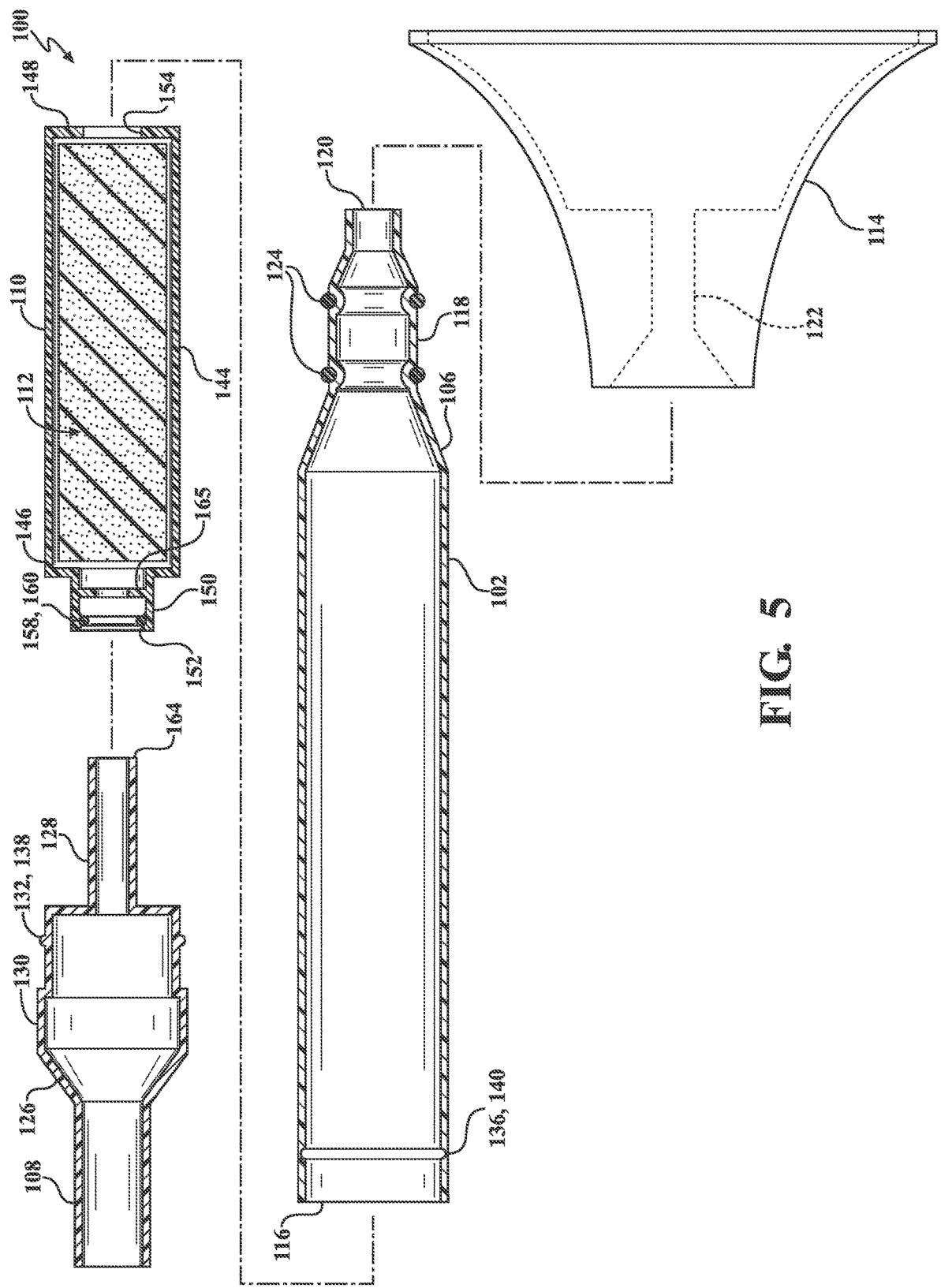
FIG. 5 is an exploded, cross-sectional, side elevational view of the candle blowing apparatus taken at section line C-C in FIG. 4.

As shown in FIGS. 3 and 5, the ornamental endpiece 114 may have a correspondingly tapered recess 122. The tapered portion 118 of the main housing 102 may be disposed in the tapered recess 122 of the ornamental endpiece 114. The ornamental endpiece 114 may be connected to the tapered portion 118 via a press- or friction-fit, as non-limiting examples.

In certain embodiments, the press- or friction-fit may be provided by at least one O-ring or seal 124 that is disposed on the tapered recess 122. In an alternative embodiment, not shown, the at least one O-ring or seal 124 may be disposed within the tapered recess 122 of the ornamental endpiece 114. It should be appreciated that the at least one O-ring or seal 124 may form a substantially fluid-tight seal between the main housing 102 and the ornamental endpiece 114. A skilled artisan may select any suitable means for connecting the main housing 102 and the ornamental endpiece 114.

It should be appreciated that the ornamental endpiece 114 may be any suitable shape including, but not limited to, a horn or a decorative toy animal head, as non-limiting examples. In certain examples, the ornamental endpiece 114 may also have the at least one filter 112 disposed therein. The user may interchange a variety of ornamental endpieces 114, as desired. Advantageously, the candle blowing apparatus 100 may be customized by the user via the ornamental endpiece 114. The user may select any suitable shape for the ornamental endpiece 114 of the candle blowing apparatus 100, as desired.

With renewed reference to FIGS. 2-5, the mouthpiece 108 may have a hollow main body 126 and a tube 128. The tube 128 may extend outwardly from, and be in fluid communication with, the hollow main body 126. The mouthpiece 108 may also have a flange 130 that functions as a hard stop during assembly to form the candle blowing apparatus 100. For example, upon assembly, where the mouthpiece 108 is disposed in the aperture 116 of the main housing 102, the flange 130 may abut the first end 104 of the main housing 102 of the candle blowing apparatus 100 to define a junction 131 (shown in FIGS. 2, 6, and 7). The flange 130 may be adapted to be flush with the outer surface of the main housing 102 upon assembly or may have a different diameter or size so as to have a different appearance relative to the remainder of the main housing 102, as desired.

As shown in FIGS. 6 and 7, the mouthpiece 108 may have first connection means 132. The first connection means 132 may be disposed on an exterior surface 134 of the hollow main body 126, for example. The main housing 102 may have corresponding second connection means 136. The second connection means 136 may be disposed on an interior surface of the main housing 102, for example. In particular, the second connection means 136 may be disposed on the interior surface adjacent to, but spaced apart from, the aperture 116 of the first end 104 of the main housing 102.

It should be appreciated that the first connection means 132 and the second connection means 136 are configured to interact and thereby removably secure the mouthpiece 108 to the main housing 102. For example, the first and second connection means 132, 136 may be pressure or snap clips. A skilled artisan may select any suitable connection means 132, 136, as desired.

In certain embodiments, for example, as shown in FIG. 6, the first connection means 132 and the second connection means 136 are configured to removably secure the mouthpiece 108 to the main housing 102 via a press-fit or a friction fit. According to this embodiment, the first connection means 132 may be a male component 138 such as an annular bead. The second connection means 136 may be a female component 140 such as an annular recess. It should be understood that the male component 138 may be adapted to be received by the female component 140 upon assembly of the candle blowing apparatus 100, and thereby removably secure the mouthpiece 108 to the main housing 102.

In other embodiments, for example, as shown in FIG. 7, the first connection means 132 and the second connection means 136 are corresponding threaded portions of the mouthpiece 108 and the main housing 102, respectively, and are configured to removably secure the mouthpiece 108 to the main housing 102 via a threaded connection. According to this embodiment, the first and second connection means 132, 136 may be corresponding threads 142. In this embodiment, the mouthpiece 108 may be screwed into the main housing 102 upon assembly.

Advantageously, the first and second connection means 132, 136 securely connect the mouthpiece 108 to the main housing 142 while allowing the user to selectively remove the mouthpiece 108, for example, to install or replace the filter cartridge 110 disposed therein. A skilled artisan may select any other suitable means for connecting the mouthpiece 108 to the main housing 102, as desired.

It should be appreciated that the mouthpiece 108 may be removably secured to the main housing 102. The mouthpiece 108 may also have the at least one filter 112 disposed therein. Advantageously, the user may remove and replace the mouthpiece 108, as desired. More than one user may thereby utilize the candle blowing apparatus 100 while further militating against the spread of germs and bacteria in operation.

Figure 10:
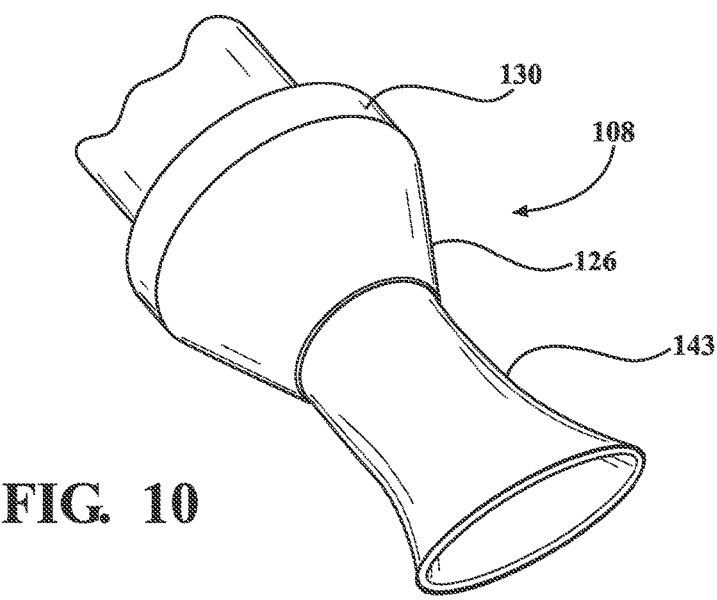
FIG. 10 is a top perspective view of the mouthpiece, according to another embodiment of the disclosure.

As shown in FIG. 10, the hollow main body 126 of the mouthpiece 108 may have a contoured end 143. Advantageously, the contoured end 143 may be ergonomic and allow the user to comfortably use the candle blowing apparatus 100. Any suitable shape for the contoured end 143 may be selected by the skilled artisan within the scope of the present disclosure.

In alternative embodiments, not shown, at least one of the main housing 102, the mouthpiece 108, and the ornamental endpiece 114 may contain a noise maker, such as a whistle, a rattle, or the like. The noise maker is configured to generate a celebratory noise where the candle blowing apparatus 100 is either shaken or blown through. The candle blowing apparatus may also contain lights. The lights may be powered by at least one battery. One of ordinary skill in the art may also select other suitable types and structures for the noise maker and lights, as desired.

It should be appreciated that the filter cartridge 110 of the present disclosure may be removably disposed in the main housing 102. Advantageously, the user may remove and replace the filter cartridge 110, as desired, in order to allow for repeated use of the candle blowing apparatus 100 over time. For example, the user may replace the filter cartridge 110 after a single one (1) use or the user may replace the filter cartridge after ten (10) uses, as desired. It should be appreciated that any number of uses for the filter cartridge 110 are contemplated by this disclosure.

Figure 4:
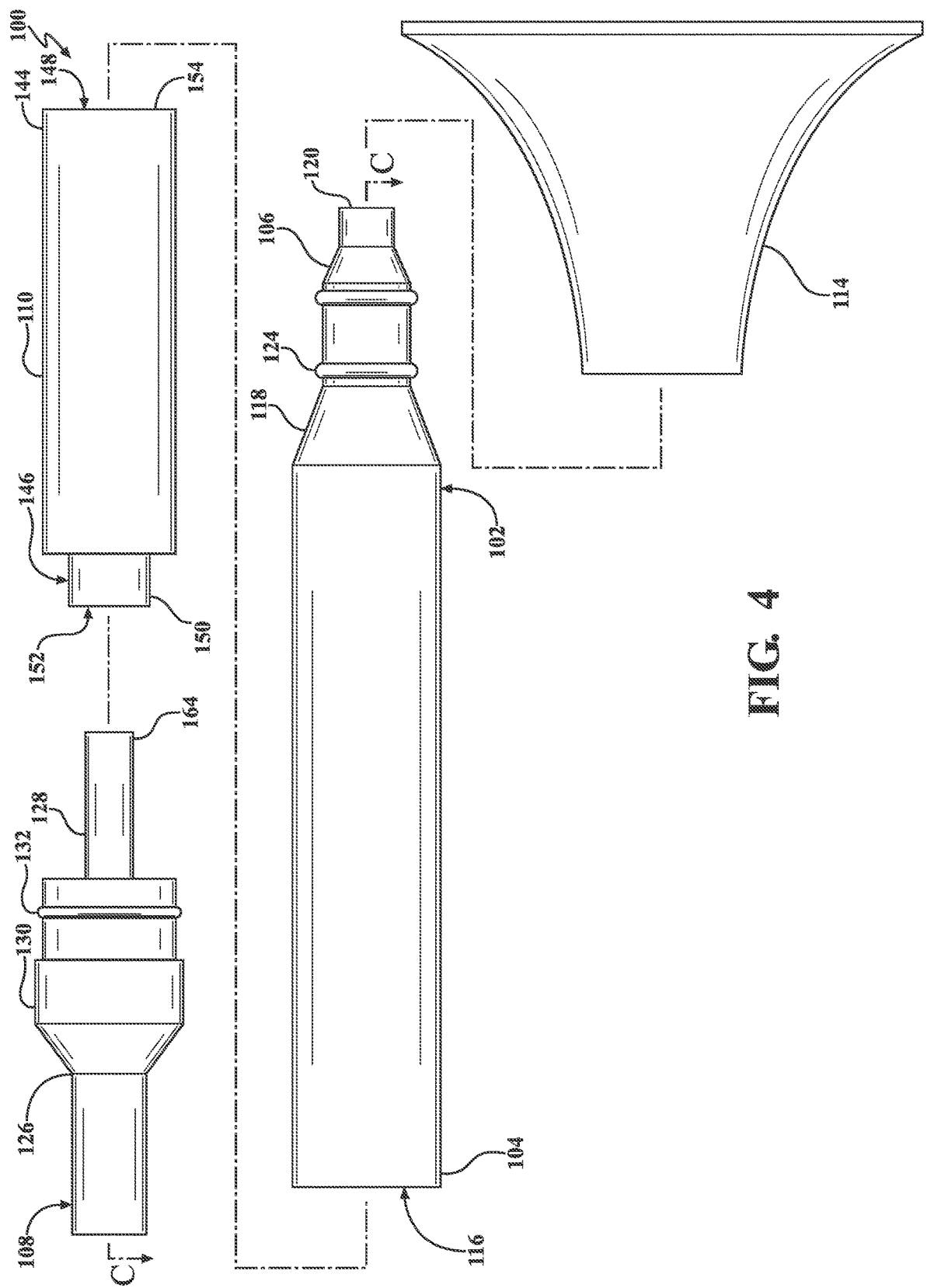
FIG. 4 is an exploded, side elevational view of the candle blowing apparatus shown in FIG. 1.

With renewed reference to FIGS. 3-5, the filter cartridge 110 may have a cartridge body 144. The at least one filter 112 may be disposed in the cartridge body 144. The cartridge body 144 may have a first end 146 a second end 148. A conduit 150 may be disposed on the first end 146 of the cartridge body 144. The cartridge body 144 may have an air inlet aperture 152 formed through the conduit 150 at the first end 146. The cartridge body 144 may also have an air outlet aperture 154 formed in the second end 148.

As shown in FIGS. 3 and 5, the at least one filter 112 may be a single filter 112 fabricated from foam of a NIOSH-standard filter rating or grade N95, N99, or P100, as non-limiting examples. Filter materials of a grade N95 or superior have been especially found to be useful for the prevention of spreading certain viruses such as those responsible the common flu or influenza. In further embodiments, the use of alternative materials for the filter 112 are contemplated, including but not limited to porous metals, meshes, and antiseptic gel filter materials. A skilled artisan may select any other suitable material for the at least one filter 112 within the scope of the present disclosure.

In a further embodiment, for example as shown in FIG. 14, the filter cartridge may be spaced apart from the main housing 102. The filter 112 may be a hollow cylinder. The filter may line the interior surface of the filter cartridge 110. In this embodiment, the second end 148 of the cartridge body 144 may be closed. The filter cartridge 144 may have a plurality of airports 176 formed therethrough. In operation, air flow may enter the cartridge body 144. Air pressure may build at the second end 148 and the air may be forced through the filter 112. The airflow may pass through the plurality of airports 176 into the main housing 102. The air may flow from the main housing 102 out the air outlet 120 of the main housing 102.

With renewed reference to FIGS. 3 and 5, in certain embodiments, the filter 112 may substantially fill an interior of the filter cartridge 110. The filter 112 may be substantially cylindrical in shape, and have a rectangular cross-section, for example, so as to confirm to the interior shape of the cartridge body 144 of the filter cartridge 110. The filter 112 may have at least one end cap. The end cap may be a mesh screen, as a non-limiting example. Advantageously, the filter 112 may allow air to pass from the air inlet aperture 152 to the air outlet aperture 154 while screening out and effectively militating against germs and bacteria exiting via the air outlet aperture 154. A skilled artisan may select any other suitable shape for the at least one filter 112, as desired.

Figure 8:
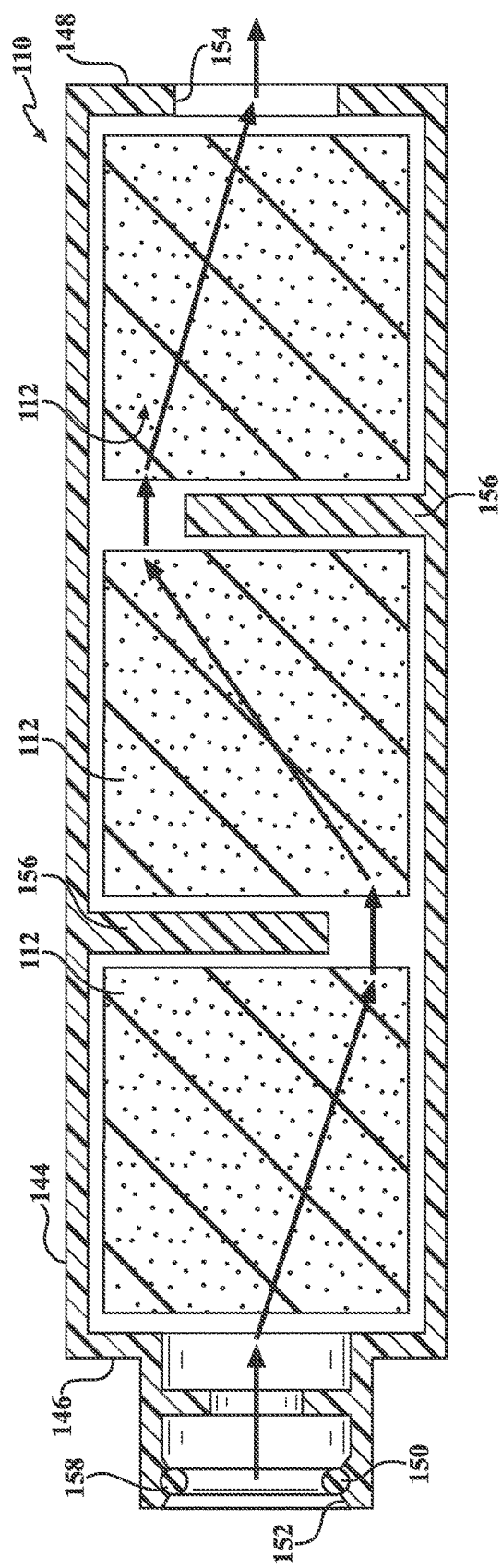
FIG. 8 is an enlarged, cross-sectional, fragmentary, side elevational view of a filter cartridge of the candle blowing apparatus taken at section line A-A in FIG. 2, according to another embodiment of the disclosure and showing a path of airflow through the filter cartridge by arrows.

Although the filter cartridge 110 is shown and described primarily herein as having a single, unitary filter 112, it should be appreciated that the filter cartridge 110 may alternatively be provided with a plurality of the filters 112. For example, as shown in FIG. 8, the plurality of filters 112 may be disposed in a series and separated from one another by at least one baffle wall 156. The at least one baffle wall 156 may be formed on an interior surface of the filter cartridge 110, for example, or may be loosely inserted as non-sealing partitions between the filters 112 upon assembly. Advantageously, the at least one baffle wall 156 may further militate against germs and bacteria exiting the air outlet aperture 154 by diverting the air flow path within the filter cartridge 110, for example, by causing the air flow path to be serpentine (shown by arrows in FIG. 8) as the air flows through the filter cartridge 110 from the air inlet aperture 152 to the air outlet aperture 154 in operation.

It should be understood that any suitable number of, and other arrangements of, the filters 112 are contemplated by the present disclosure. The filter cartridge 110 may contain the at least one filter 112, and optionally the baffles 156, as described hereinabove, but may also contain O-rings and fixed baffle integral seals (not shown), as other non-limiting examples. A skilled artisan may select any other suitable constructions for the filter cartridge 110 and its various components, as desired.

As shown in FIGS. 3 and 5, the filter cartridge 110 may further include sealing means 158. The sealing means 158 may create a substantially fluid-tight seal between the at least one filter cartridge 110 and the mouthpiece 108 upon assembly. Advantageously, the fluid-tight seal militates against air exiting the main housing 102 without passing through the at least one filter 112 of the filter cartridge 110. Thus, the air-tight seal further militates against the spread of germs and bacteria while extinguishing candles and allows for the repeated hygienic use of the same main housing 102.

In certain embodiments, for example, as depicted in FIG. 3, the sealing means 158 may be an O-ring 160. The O-ring 160 may be disposed in the conduit 150 of the filter cartridge 110. For example, the conduit 150 may have an annular groove 162 formed in a substantially laterally central location on an interior surface of the conduit 150. The groove 162 may receive a portion of the O-ring 160 and retain it in a lateral position within the conduit 150. In particular, it should be understood that the groove 162 may hold the O-ring 160 in place spaced apart from the first end 146 of the cartridge body 144.

Furthermore, as shown in FIG. 3, an end 164 of the tube 128 of the mouthpiece 108 may be disposed through the conduit 150 of the cartridge body 146 upon assembly. The end 164 may abut an interior stop wall 165 at the first end 146 of the cartridge body 144, for example, where fully inserted into the conduit 150. An exterior surface of the tube 128 may contact and compress the O-ring 160, and thereby create the substantially fluid-tight seal to form the air flow path between the mouthpiece 108 and the filter cartridge 110.

Figure 9:
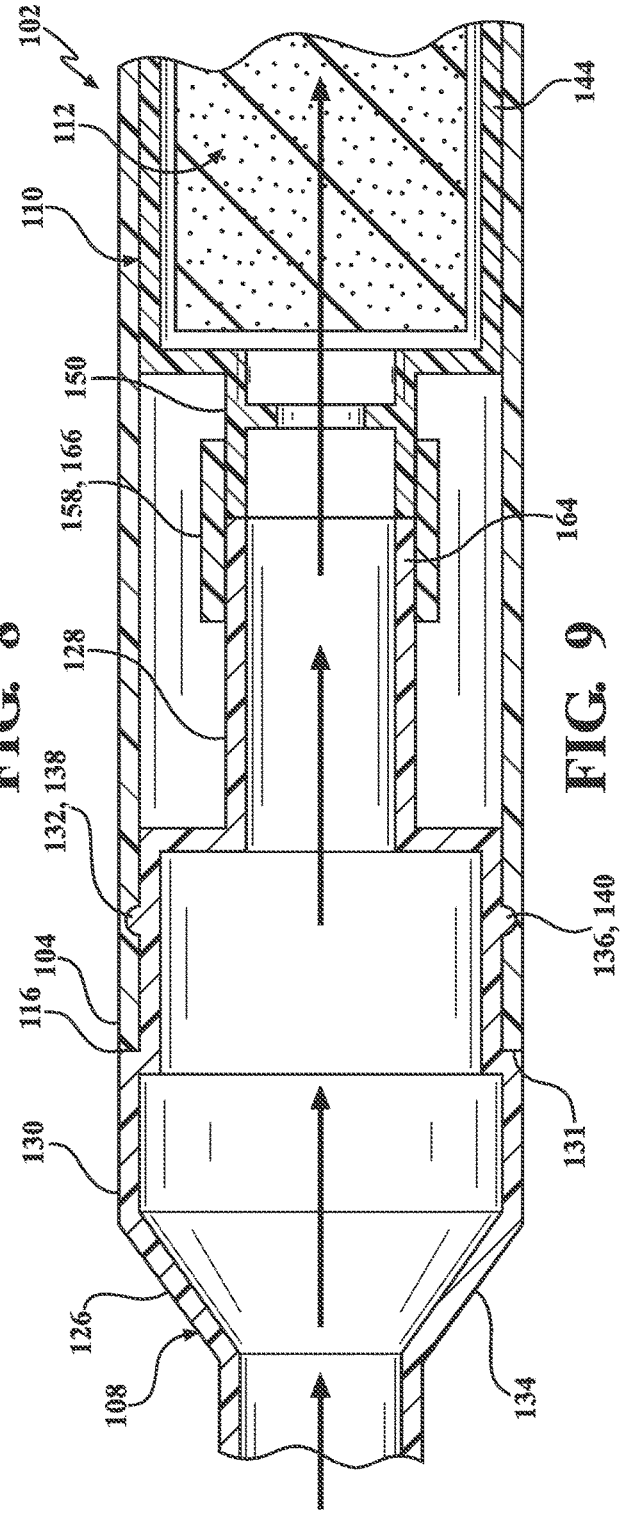
FIG. 9 is an enlarged, cross-sectional, fragmentary, side elevational view illustrating the connection of the mouthpiece and the filter cartridge of the candle blowing apparatus taken at section line A-A in FIG. 2, according to yet another embodiment of the disclosure and showing a flexible sleeve for connecting the mouthpiece and the filter cartridge.

In other embodiments, for example as illustrated in FIG. 9, the sealing means 158 may be provided in the form of a sealing sleeve 166. The sleeve 166 may be substantially tubular in shape and configured to receive each of the end of the tube 128 and the conduit 150 and hold the same together in the fluid-tight sealing arrangement. The sleeve 166 may be flexible and fabricated from rubber or silicone, as one non-limiting example. A skilled artisan may select any suitable material and shape for the sealing sleeve 166, as desired.

As shown, the sleeve 166 may normally be disposed on the conduit 150 of the cartridge body 146. Upon assembly, the sleeve 166 may then receive the tube 128 of the mouthpiece 108. The end 164 of the tube 128 of the mouthpiece 108 may abut or be disposed adjacent the conduit 150 of the cartridge body 146 of the filter cartridge 110, as shown in FIG. 9. The sealing sleeve 166 creates the substantially fluid-tight seal, as described hereinabove. The combined mouthpiece 108, sealing sleeve 166, and filter cartridge 110 may subsequently be inserted into the main housing 102 for end use.

It should be understood that other suitable means of connecting the mouthpiece 108 and the filter cartridge 110, and creating a substantially fluid-tight seal, are contemplated and considered encompassed by the present disclosure. These suitable means may militate against air exiting the main housing 102 without passing through the filter 112 of the filter cartridge 110 where the user blows into the mou009200thpiece 108, as shown in FIG. 1.

Figure 11:
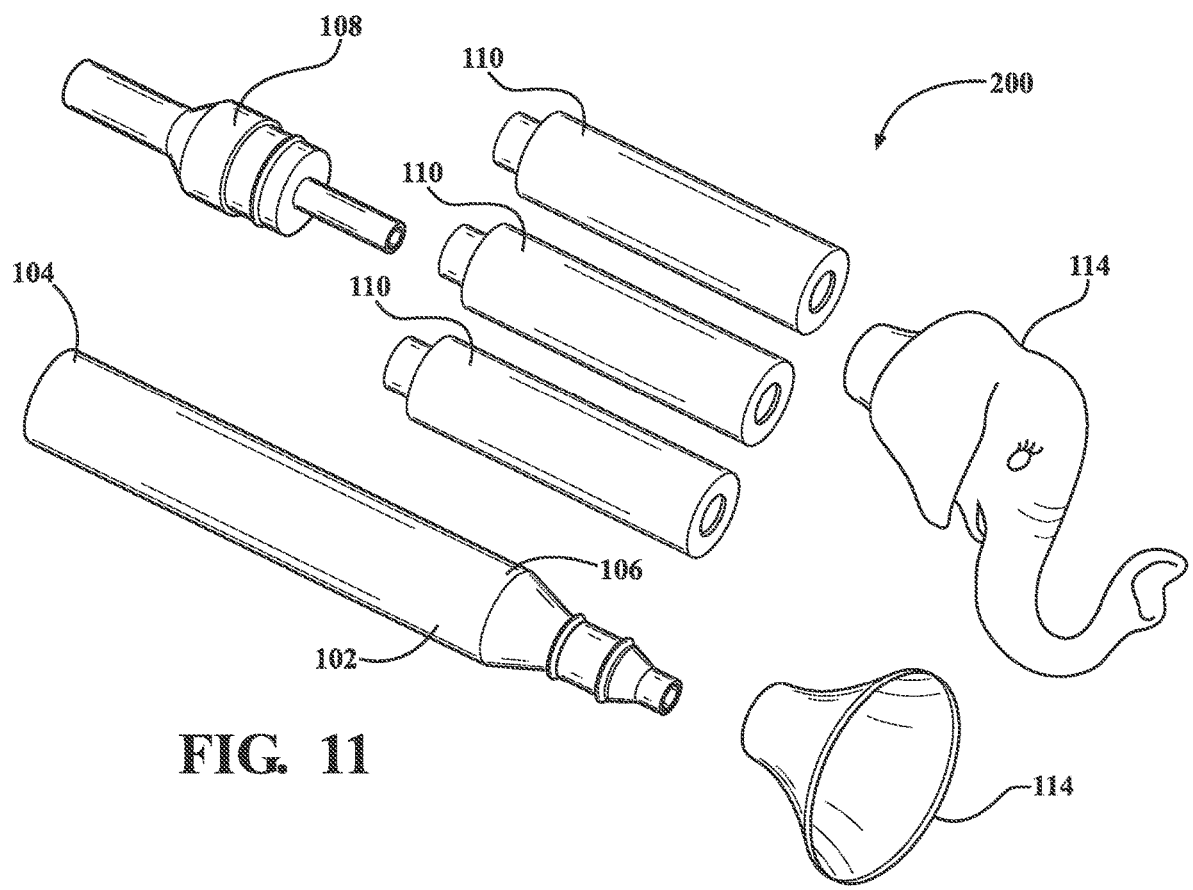
FIG. 11 is a top perspective view of a kit according to one embodiment of the present disclosure.

Referring now to FIG. 11, the present disclosure further includes a kit 200 for customizing the candle blowing apparatus 100. The kit 200 contains each of the primary components described hereinabove, both disconnected but arranged in a package for subsequent assembly and use. The kit 200 may have the main housing 102 with the first end 104 and the second end 106, which is separately provided from the mouthpiece 108. The mouthpiece 108 configured to be removably coupled to the first end 104 of the main housing 106 and as shown and described hereinabove.

In a further embodiment of the present disclosure, for example as shown in FIG. 13, the ornamental end piece 114 may be integrally formed with the main housing 102. The main housing 102 may have a tube 168 disposed on the tapered end 118 of the main housing 102. The tube 168 may include at least one brace 172. The at least one brace 172 may securely hold the tube 168 in the main housing 102. The main housing 102 may further have a baffle wall 170. The filter cartridge 110 may abut the baffle wall 170 such that air may pass from the filter cartridge 110 to the tube 168. The candle blowing apparatus may have an end cap 174. The end cap may be removably disposed on the tube 168. Advantageously, the tube 168 may allow for improved airflow through the main housing 102, in operation.

The kit 200 may have the at least one filter cartridge 110 including at least one filter 112. The filter cartridge 110 may be configured to be removably disposed within the main housing 102 between the first end 104 and the second end 106. The filter cartridge may be configured to be in fluid communication with the mouthpiece 108. The at least one filter cartridge may be a plurality of filter cartridges as shown and described hereinabove.

The ornamental endpiece 114 may be configured to be removably coupled to the second end 106 of the main housing 102. The ornamental endpiece 114 may be configured to be in fluid communication with the filter cartridge 110. The ornamental endpiece 114 together with the mouthpiece 108 and the filter cartridge 110 may be configured to define the air flow path for delivery of the extinguishing gust of air to the candle.

The kit 200 may include a plurality of ornamental endpieces 114. In operation, the user may select any suitable shape for the ornamental endpiece 114 including but not limited to horns, cartoon characters, and toy animal heads. Any other suitable type of ornamental endpiece 114 may be selected and provide separately or in the kit 200 for use with the candle blowing apparatus 100, as desired.

Figure 12:
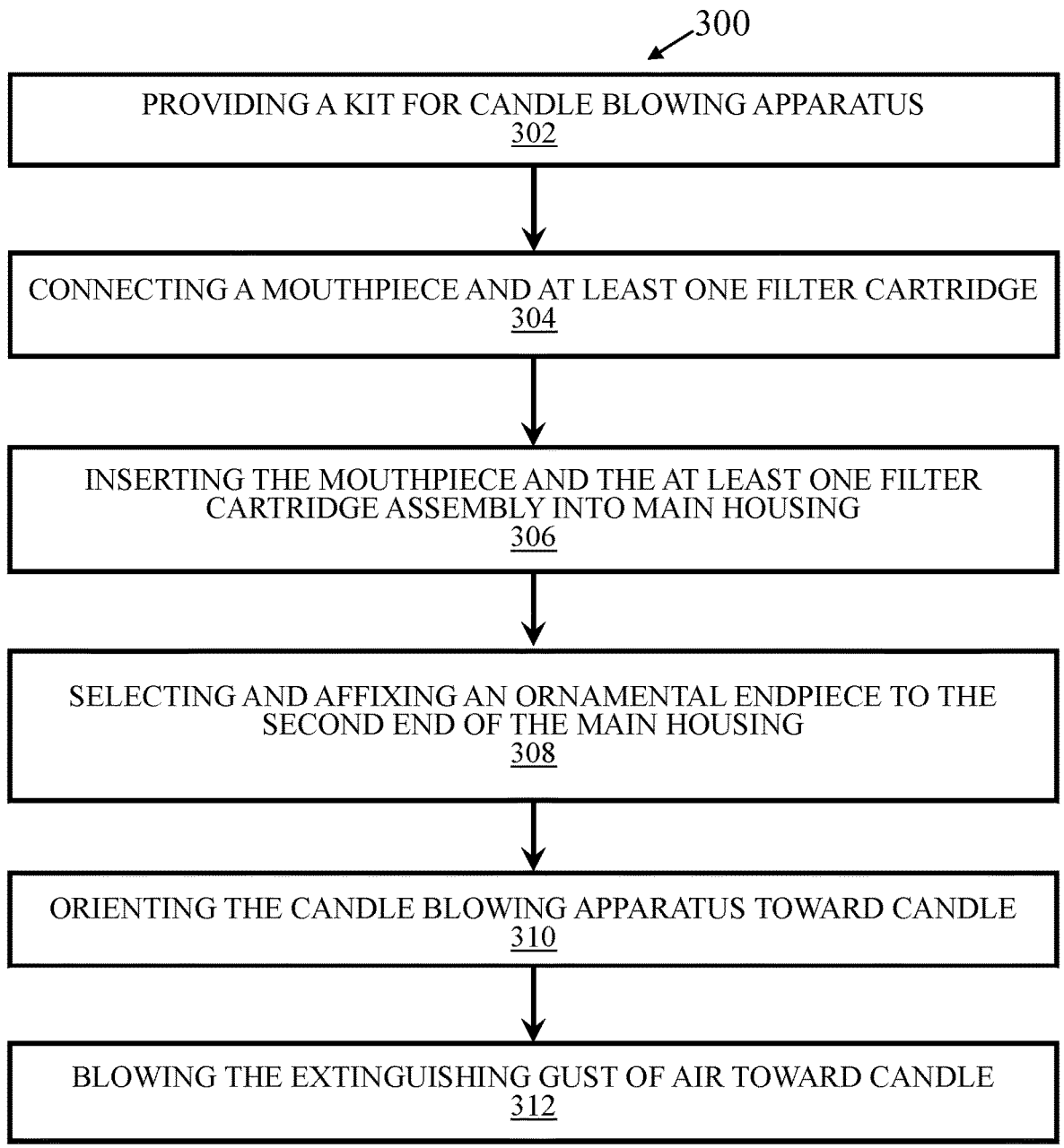
FIG. 12 is a flow chart illustrating a method of use according to one embodiment of the present disclosure.
Figure 15:
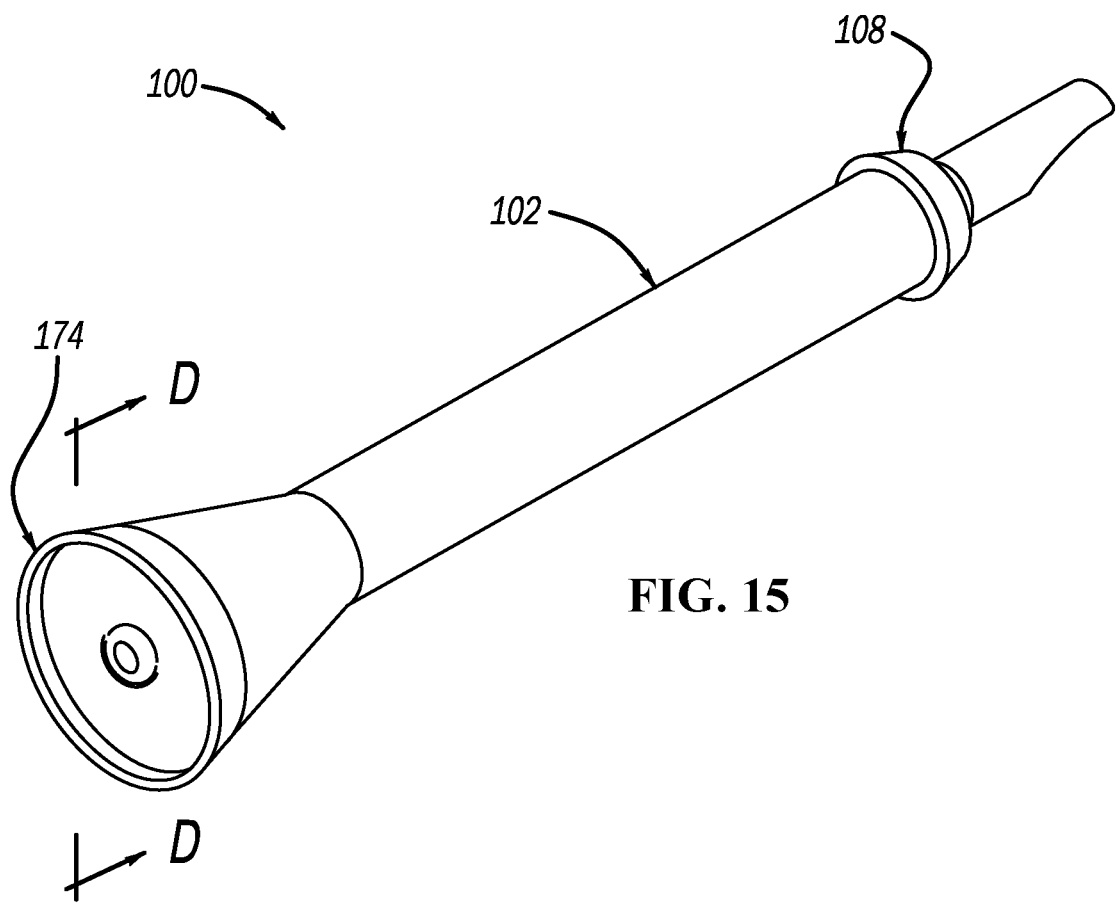
FIG. 15 is a top perspective view of the candle blowing apparatus, according to one embodiment of the present disclosure.
Figure 16:
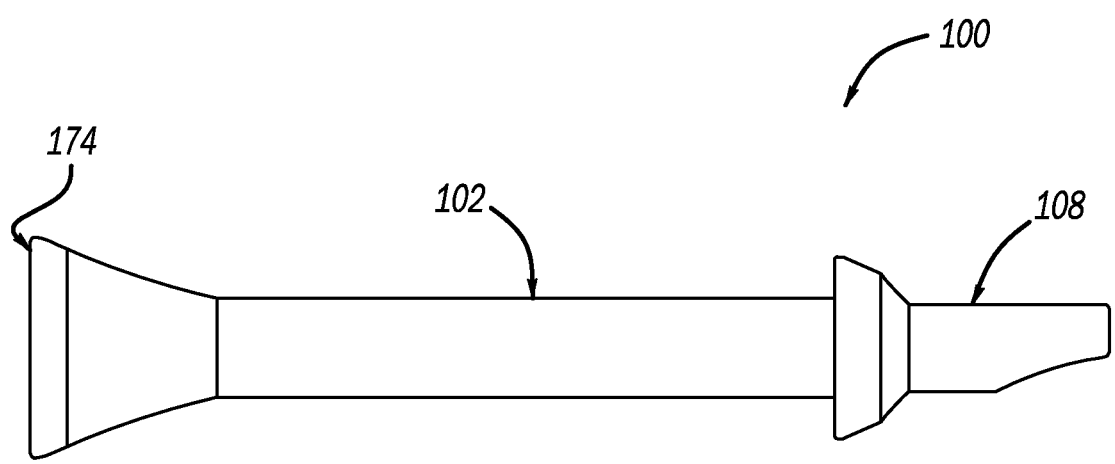
FIG. 16 is a right-side elevational view of the candle blowing apparatus, as shown in FIG. 15.
Figure 17:
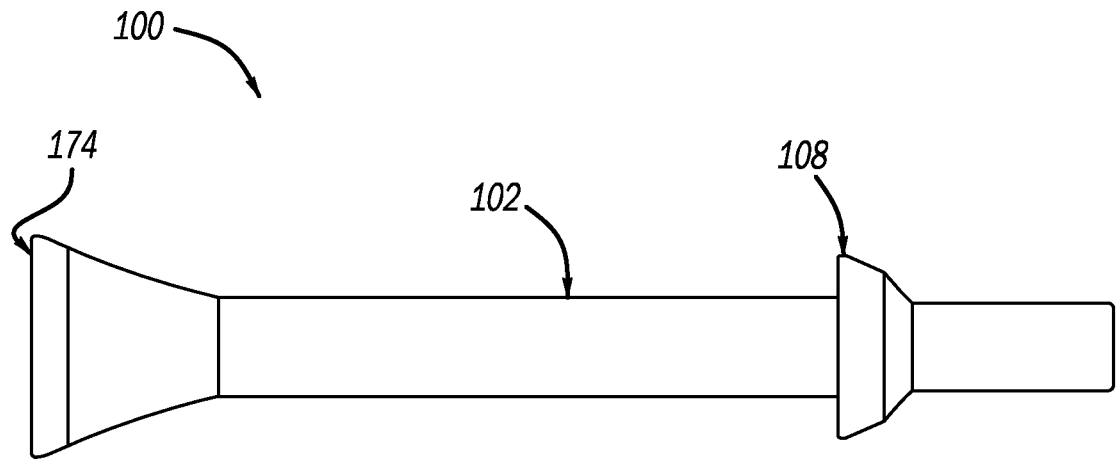
FIG. 17 is a top plan view of the candle blowing apparatus, as shown in FIGS. 15-16.
Figure 18:
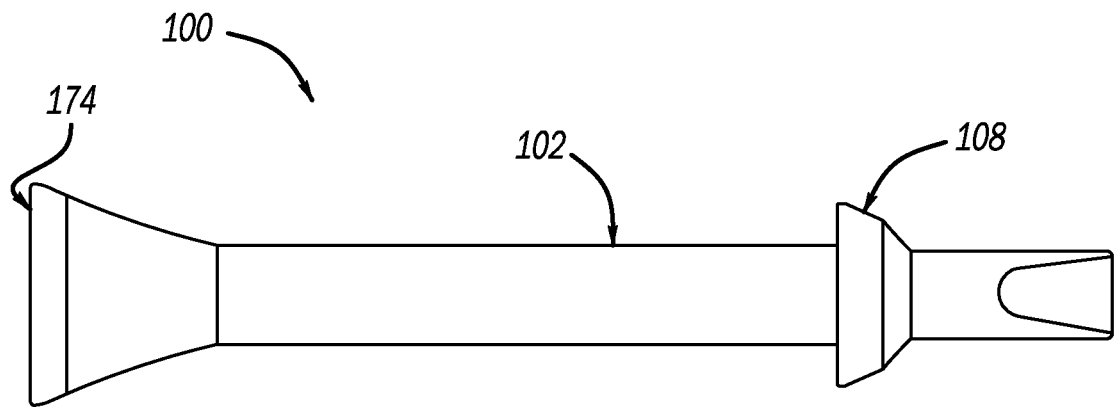
FIG. 18 is a bottom plan view of the candle blowing apparatus, as shown in FIGS. 15-17.
Figure 19:
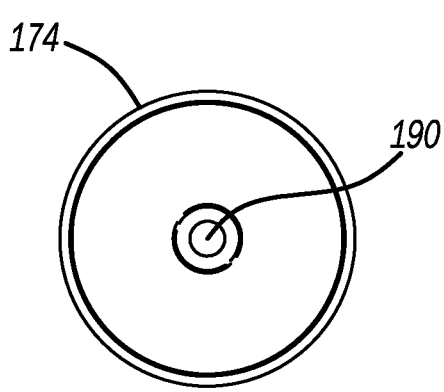
FIG. 19 is a front elevational view of the candle blowing apparatus, as shown in FIGS. 15-18.
Figure 20:
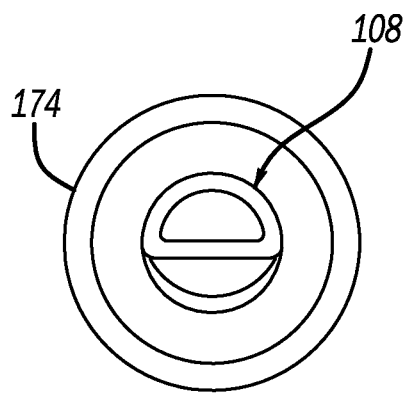
FIG. 20 is a rear elevational view of the candle blowing apparatus, as shown in FIGS. 15-19.

With reference to FIG. 12, the present disclosure further includes a method 300 for using the candle blowing apparatus 100. In a first step 302, the kit 200 for the candle blowing apparatus 200 may be provided. The kit 200 may including the following separate components: the main housing 102, the mouthpiece 108, the at least one filter cartridge 110 including at least one filter 112, and an ornamental endpiece 114, substantially as described hereinabove The method 300 may have a second step 304 of connecting the mouthpiece 108 and at least one filter cartridge 110. In one embodiment, the tube 128 of the mouthpiece 108 may be inserted into the conduit 150 of the cartridge body 144. In another embodiment, the tube 128 may be inserted into the sealing sleeve 166 of the cartridge body 144 in the second step 304.

A third step 306 of the method 300 may include inserting the mouthpiece 108 and the at least one filter cartridge 110 into the main housing 102 and disposing the ornamental endpiece 114 on the main housing 102. The ornamental endpiece 114 may be pressed onto the tapered portion 116 of the main housing 102.

The third step 106 may further include securing the mouthpiece 108 to the main housing 102 via the connecting means 132, 136. In one embodiment, the mouthpiece 108 may be snapped into the main housing 102 such that the male component 138 interacts with the female component 140 to removably secure the mouthpiece 108 to the main housing 102. In another embodiment, the mouthpiece 108 may be screwed into the main housing 102 via the corresponding threads 142. The candle blowing apparatus 100, upon assembly in this fashion, may define the air flow path from the mouthpiece 108 to the ornamental endpiece 114, for delivery of the gust of air to the candle.

The method 300 may have a fourth step 308 of selecting and affixing the ornamental endpiece 114 to the second end 106 of the main housing 102. The tapered portion 118 of the main housing 102 may be disposed in the tapered recess 122 of the ornamental endpiece 114.

A fifth step 310 of the method 300 may include an orienting of the candle blowing apparatus 100. The user may orient the candle blowing apparatus 100 such that the ornamental endpiece 114 is directed towards the candle on the cake, for example.

A sixth step 312 of the method 300 may include the user blowing the extinguishing gust of air toward the candle. The user may blow air into the mouthpiece 108. The air may flow through the tube 128 to the filter cartridge 110. The air may be filtered by the at least one filter 110 and exit the cartridge body 144. The air may pass through the tapered portion 118 of the main housing 102 and out the air outlet 120. From the air outlet 120, the air may pass through the ornamental endpiece 114 as the gust of air to extinguish the candle (shown in FIG. 1).

In certain embodiments, as shown in FIGS. 21-25, the candle blowing apparatus 100 may include a filter 178 rather than the filter cartridge 110. The filter 178 may be substantially disc-shaped or substantially cylindrically-shaped. The filter 178 may include a pad configured to effectively militate against germs, bacteria, and viruses from passing through the end cap 174. The filter 178 may be removably disposed within the main housing 102 between the first end 104 and the second end 106. The filter 178 may be in fluid communication with the mouthpiece 108. As a non-limiting example, the filter 178 may be between 40 mm to 55 mm thick. In another specific example, the filter 178 may include a substantially flat and/or a substantially pleated surface. The filter 178 may be fabricated from a foam or mesh material. For instance, the filter 178 may be constructed from a material having a NIOSH-standard filter rating or grade N95, N99, or P100, as non-limiting examples. One skilled in the art may select other suitable shapes, sizes, materials, and textures to provide the filter 178, within the scope of the present disclosure.

In certain embodiments, as shown in FIGS. 21-24, the end cap 174 may be removably coupled to the second end 106 of the main housing 102. In another specific example, the end cap 174 may be removably coupled to the second end 106 of the main housing 102 via a friction fit, pressure fit, complementary nodes/recesses, clips, threads, and/or adhesives. Advantageously, the end cap 174 may be configured to selectively retain the filter 178 within the main housing 102. Desirably, the filter 178 may be replaced with a new filter 178 within the main housing 102 where the end cap 174 is selectively unengaged from the main housing 102.

In certain circumstances, as shown in FIGS. 21-26, the main housing 102 may include ways to adequately support the filter 178. In a specific example, the main housing 102 may include a shelf 179 configured to contact and support the filter 178. The shelf 179 may include an annular platform disposed substantially parallel with the filter 178. In another specific example, the main housing 102 may include a support structure 180. The shelf 179 and the support structure 180 may both support a first surface 181 of the filter 178. The support structure 180 may have one or more legs 182 extending from the interior surface of the main housing 102. The one or more legs 182 may be configured to support the filter 178 while still allowing additional and adequate air flow through the filter 178. In a specific example, the one or more legs 182 may be particularly positioned to enhance the support of the filter 178 while maximizing the airflow through the filter 178. For instance, at least a portion of each of the legs 182 may be disposed substantially parallel with the substantially flat and/or the substantially pleated surface of the filter 178. In other words, the support structure 180 may include a flange 183 configured to be disposed substantially parallel with a surface of the filter 182. In a more specific example, each of the legs 182 may be connected to one another. For instance, the support structure 180 may further include a ring 184 supported at an end of each of the legs 182 and/or the flanges 183. The ring 184 may also be disposed substantially parallel with the substantially flat and/or a substantially pleated surface of the filter 178. Advantageously, the ring 184 includes an aperture 186 to permit air to flow directly through the support structure 180 without substantially being obstructed. In other words, the aperture 186 of the ring 184 may be oriented substantially inline with an airflow path 188 between the mouthpiece 108 and through the end cap 174. In a specific example, air may flow between each of the legs 182 and through the aperture 186 of the ring 184. In a more specific example, the support structure 180 may obstruct less than fifty percent of a surface area of the first surface 181 of the filter 178. In an even more specific example, the support structure 180 may obstruct less than thirty percent of the surface area of the first surface 181 of the filter 178.

Figure 26:
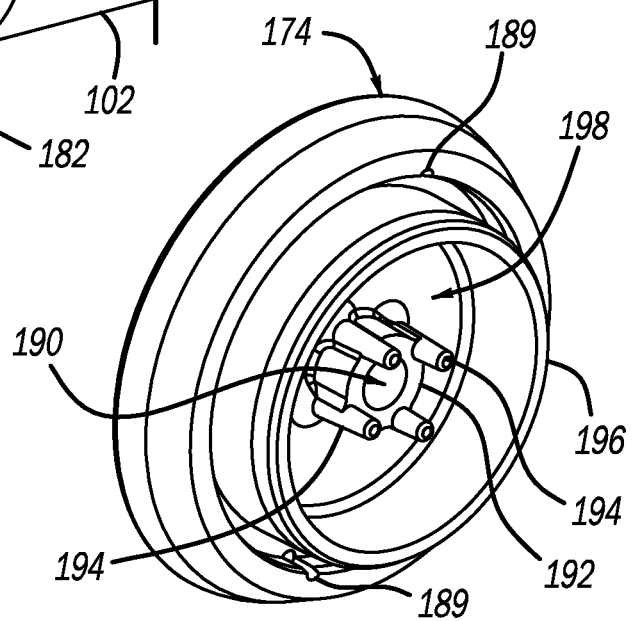
FIG. 26 is a top perspective view of an interior surface of the end cap, further depicting an inner protrusion and an outer protrusion, according to one embodiment of the present disclosure.

In certain circumstances, with continued reference to FIG. 26, the end cap 174 may include ways to militate against air from being trapped between the main housing 102 and the end cap 174 while the end cap 174 is being coupled to the main housing 102. For instance, the end cap 174 may include a vent 189 configured to permit air to escape from between the end cap 174 and the main housing 102. In a specific example, the vent 189 may include a channel disposed on the end cap 174. Advantageously, the vent 189 provides a pressure release feature so that the end cap 174 may be more easily coupled to the main housing 102.

Figure 24:
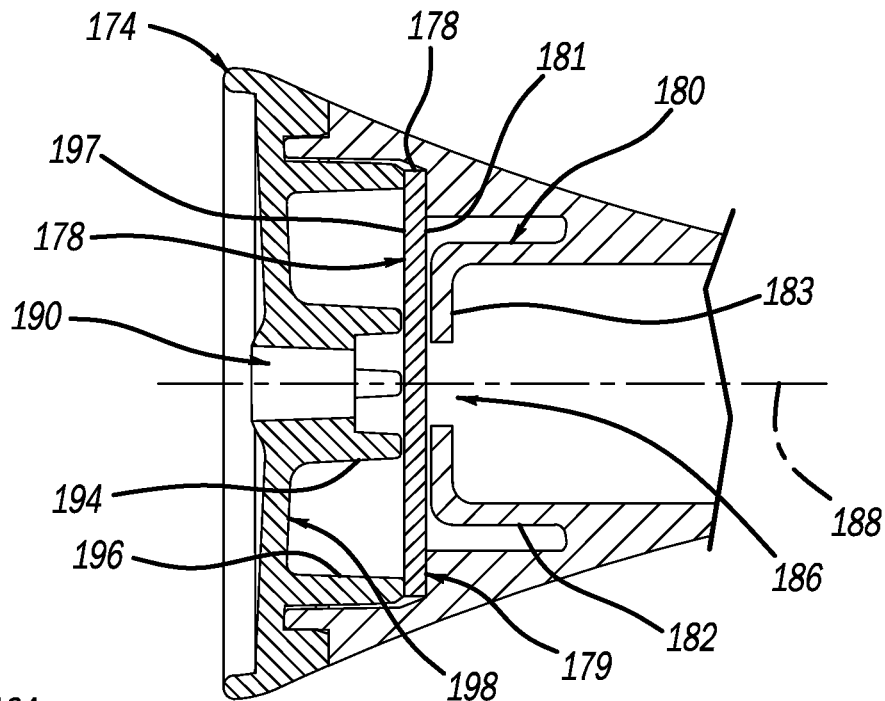
FIG. 24 is an enlarged cross-sectional view taken at call-out E in FIG. 23, according to one embodiment of the present disclosure.

In certain circumstances, the end cap 174 may include ways to adequately retain the filter 178 in the main housing 102. For instance, the end cap 174 may include an airway aperture 190 disposed substantially inline with the airflow path 188 between the mouthpiece 108 and through the end cap 174. The end cap 174 may further include a cylindrical tube 192 disposed adjacent to and substantially inline with the airway aperture 190. The end cap 174 may also include a protrusion 194, 196 configured to retain the filter 178 in the main housing 102. In a specific example, the protrusion 194, 196 may include an inner protrusion 194 and an outer protrusion 196. The inner protrusion 194 and the outer protrusion 196 may both contact and support a second surface 197 of the filter 178. The inner protrusion 194 may include a plurality of nodes disposed substantially adjacent to the cylindrical tube 192, the plurality of nodes extending from an interior surface 198 of the end cap 174. Advantageously, the plurality of nodes are configured to contact and support the second surface 197 of the filter 178, while still providing space between each of the nodes for enhanced airflow. The outer protrusion 196 may include an annular wall extending from the interior surface 198 of the end cap 174. In a more specific example, the inner protrusion 194 may be spaced apart from the outer protrusion 196 on the interior surface 198 of the end cap 174. As shown in FIG. 24, a cross-section of the inner protrusion 194, the outer protrusion 196, and the interior surface 198 of the end cap 174 may be substantially U-shaped. Advantageously, the spacing formed on the interior surface 198 between the inner protrusion 194 and the outer protrusion 196 may provide a condensation trap. In other words, when air is pushed through the candle blowing apparatus 100, saliva and/or condensation may collect in the spacing formed on the interior surface 198 of the end cap 174 between the inner protrusion 194 and the outer protrusion 196. Desirably, the cylindrical tube 192 may militate against the condensation and/or saliva from passing through the airway aperture 190.

Figure 21:
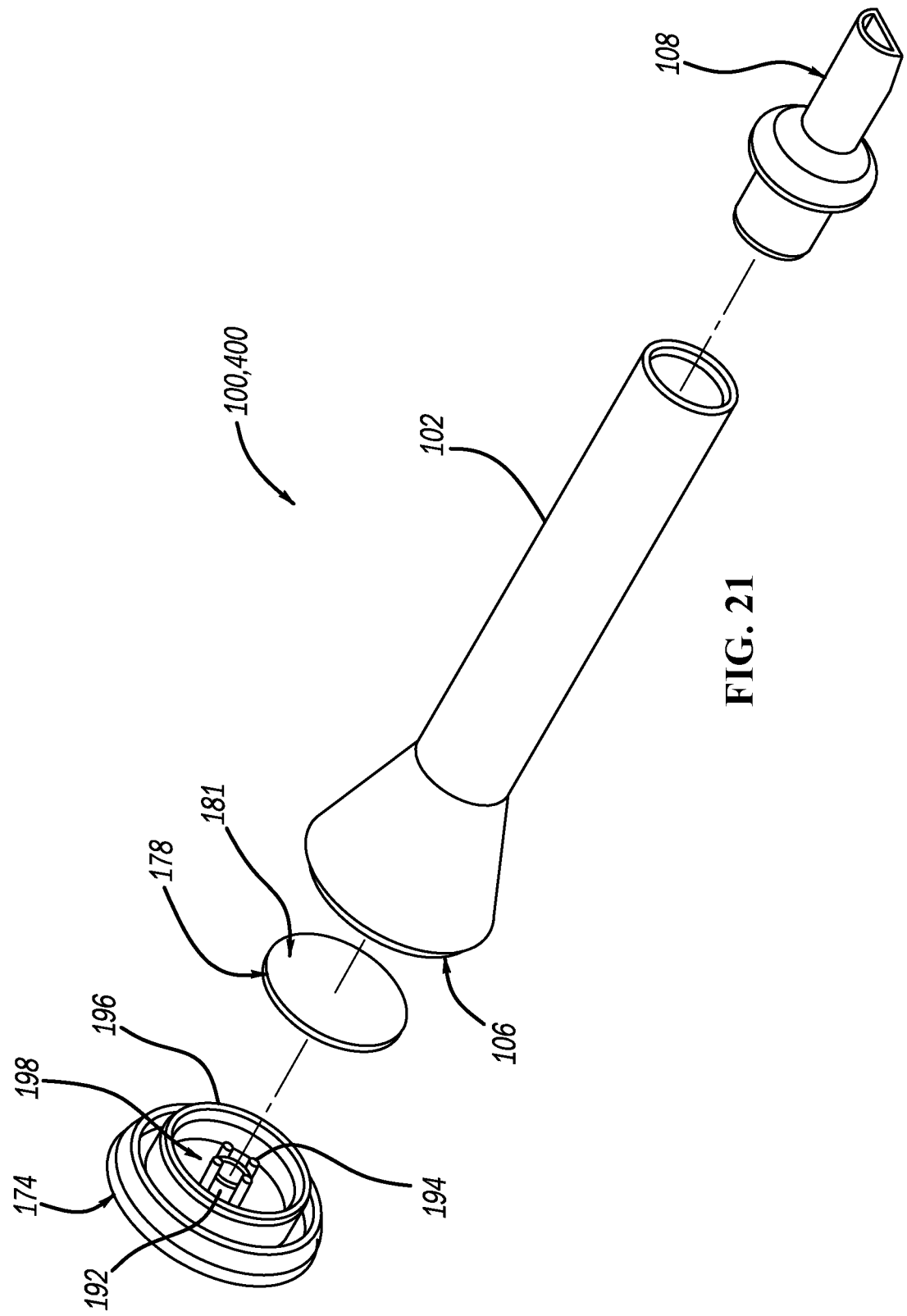
FIG. 21 is an exploded top perspective view of the candle blowing apparatus, as shown in FIGS. 15-20, according to one embodiment of the present disclosure.
Figure 22:
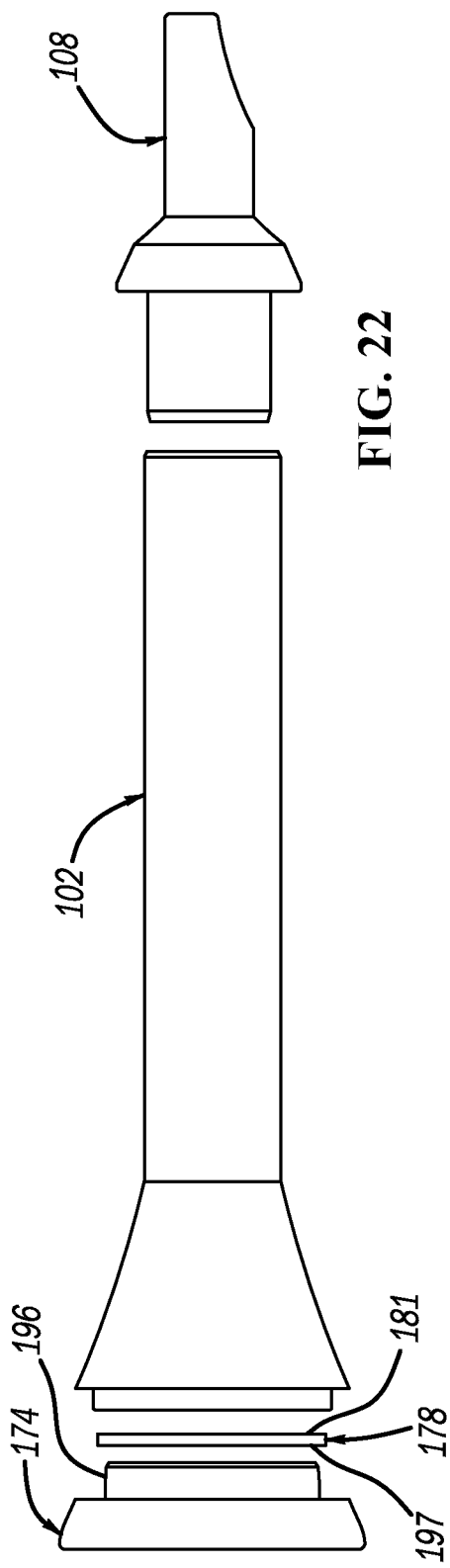
FIG. 22 is an exploded right-side elevational view of the candle blowing apparatus, as shown in FIG. 21, according to one embodiment of the present disclosure.
Figure 23:
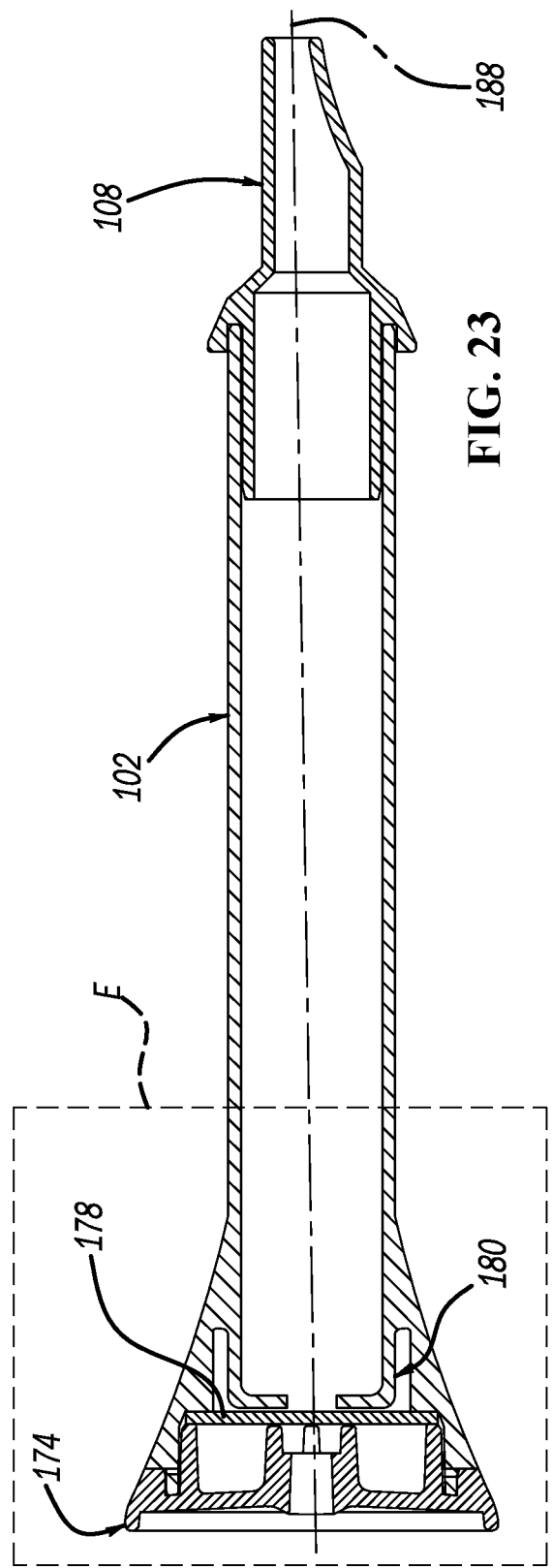
FIG. 23 is a cross-sectional view taken at section line D-D in FIG. 15, according to one embodiment of the present disclosure.
Figure 25:
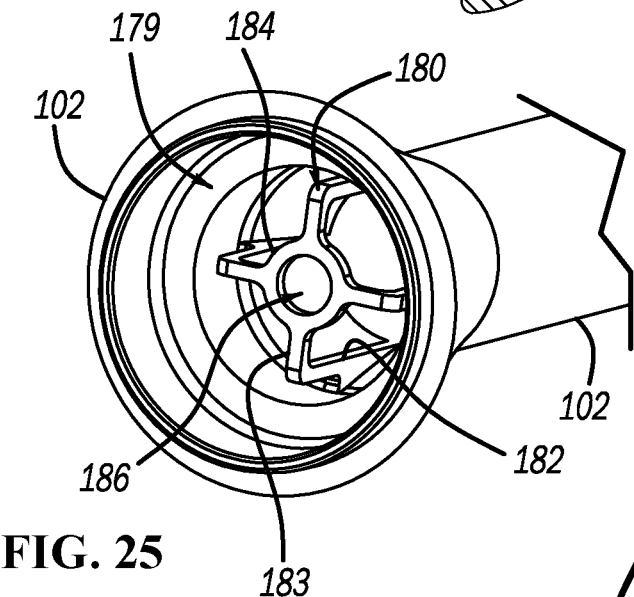
FIG. 25 is an enlarged top perspective view of the second end of the main housing without an end cap coupled thereto, further depicting a support structure and a shelf of the main body, according to one embodiment of the present disclosure.

In certain circumstances, as shown in FIG. 21, the candle blowing apparatus 100 may be provided as a second kit 400. The kit 400 may include a main housing 102, a mouthpiece 108, a filter 178, and an end cap 174. The main housing 102 may have a first end 104 and a second end 106. The main housing 102 may also include a support structure 180 disposed within the main housing 102 and configured to support the filter 178. As shown in FIG. 25, the support structure 180 may have a leg 182 configured to enhance the support of the filter 178. The mouthpiece 108 may be configured to be coupled to the first end 104 of the main housing 102. The filter 178 may be configured to be removably disposed within the main housing 102 between the first end 104 and the second end 106. The filter 178 may be in fluid communication with the mouthpiece 108. The end cap 174 may be configured to be removably coupled to the second end 106 of the main housing 102 and in fluid communication with the filter 178. Together, the end cap 174, the main housing 102, the mouthpiece 108, and the filter 178 may define an air flow path 188 for delivery of an extinguishing gust of air to a candle.

Figure 27:
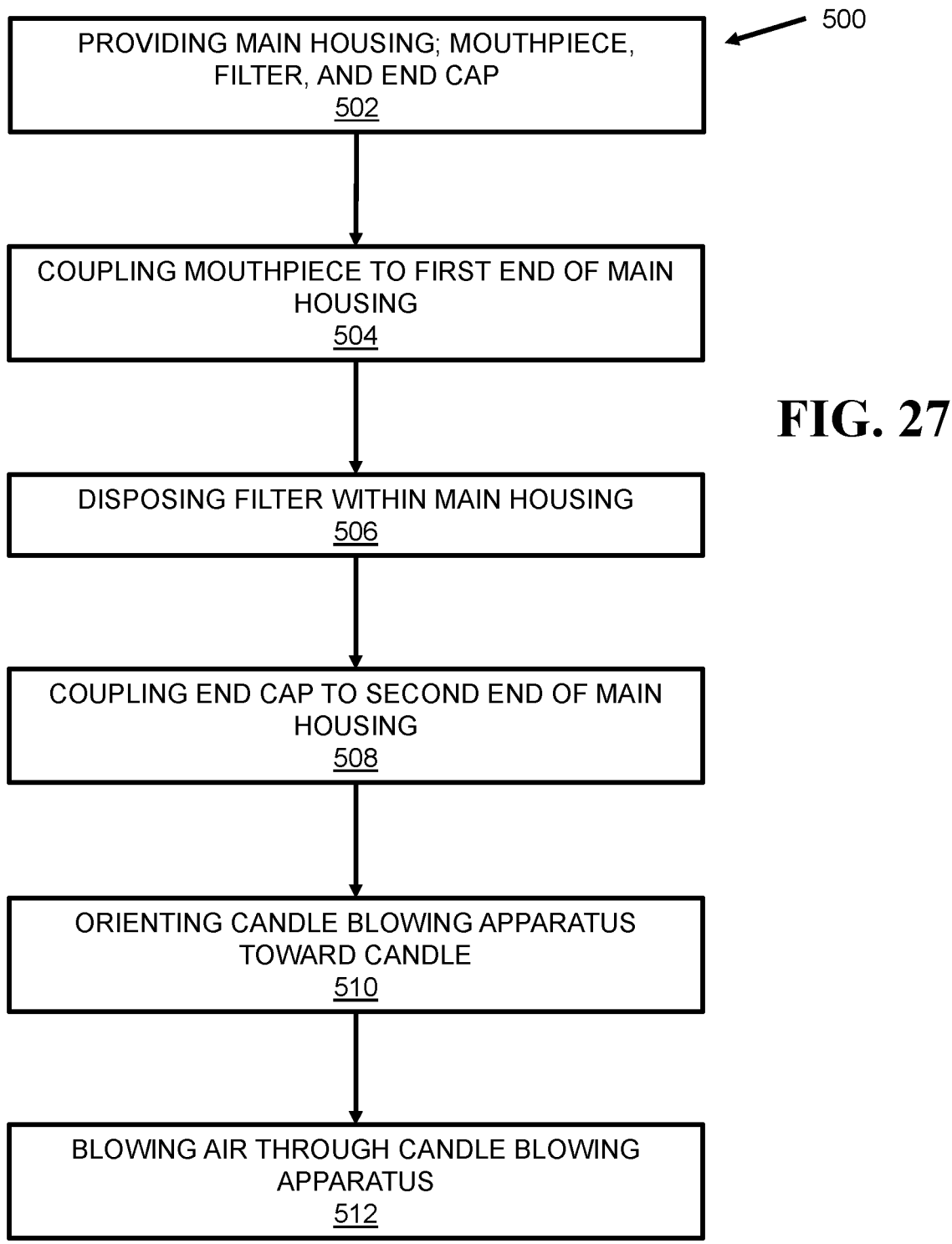
FIG. 27 is a flow chart illustrating a second method of using the candle blowing apparatus, according to one embodiment of the present disclosure.

In certain circumstances, as shown in FIG. 27, the present disclosure may further include a second method 500 for using the candle blowing apparatus 100. The second method 500 may include a step 502 of providing the candle blowing apparatus 100 having a main housing 102, a mouthpiece 108, a filter 178, and an end cap 174. The main housing 102 may have a first end 104 and a second end 106. The main housing 102 may also include a support structure 180 disposed within the main housing 102 and configured to support the filter 178. The support structure 180 may have a leg 182 configured to enhance the support of the filter 178. The mouthpiece 108 may be coupled to the first end 104 of the main housing 102. The filter 178 may be removably disposed within the main housing 102 between the first end 104 and the second end 106. The filter 178 may be in fluid communication with the mouthpiece 108. The end cap 174 may be removably coupled to the second end 106 of the main housing 102 and in fluid communication with the filter 178. Together, the end cap 174, the main housing 102, the mouthpiece 108, and the filter 178 may define an air flow path 188 for delivery of an extinguishing gust of air to a candle. Next, the second method 500 may include coupling the mouthpiece 108 to the first end 104 of the main housing 102. Then, the second method 500 may include disposing the filter 178 within the main housing 102 between the first end 104 and the second end 106. The end cap 174 may then be coupled to the second end 106 of the main housing 102, whereby the candle blowing apparatus 100 is assembled. The candle blowing apparatus 100 may be oriented toward a candle. A user may then blow through the candle blowing apparatus 100 to create the extinguishing gust of air and extinguish the candle in a hygienic manner.

Advantageously, the candle blowing apparatus 100 may filter air blown at candles and remove substantially all germs or pathogens from the resulting gust of air. The candle blowing apparatus 100 features the removable filter 178 to allow for repeated hygienic uses of the apparatus 100. It is further beneficial that the candle blowing apparatus 100 allows for customization via an interchangeable ornamental endpiece 114, as described hereinabove.

While certain representative embodiments and details have been shown for purposes of illustrating the invention, it will be apparent to those skilled in the art that various changes may be made without departing from the scope of the disclosure, which is further described in the following appended claims.

What is claimed is:

1. A candle blowing apparatus for extinguishing a candle, the candle blowing apparatus comprising:
 a generally hollow main housing having a first end, a second end, and an interior surface defining an airflow path through the main housing, wherein the second end includes a first opening therethrough, wherein the interior surface near the second end of the main housing includes a shelf extending along the interior surface, the shelf being disposed a distance away from the second end and having a second opening therethrough, and wherein a diameter of the second opening of the shelf is less than a diameter of the first opening of the second end of the main housing;
 a mouthpiece coupled to the first end of the main housing;
 a filter configured to be removably disposed within the main housing between the shelf and the second end of the main housing, the filter capable of being in fluid communication with the mouthpiece;
 a support structure having at least one flange configured to partially obstruct the second opening of the shelf, wherein the at least one flange is configured to extend orthogonally to the airflow path through the main housing, and wherein the at least one flange is configured to support the filter; and
 an end cap configured to be removably coupled to the second end of the main housing and entirely cover the first opening of the second end of the main housing, wherein the end cap is configured to contact the filter for securing the filter against the shelf of the main housing or the at least one flange of the support structure, and wherein the end cap can be in fluid communication with the filter and includes an airway aperture defining the airflow path for delivery of an extinguishing gust of air to the candle.

2. The candle blowing apparatus of claim 1, wherein the end cap has a cylindrical shape with a generally flat first surface and an opposing parallel second surface, the first and second surfaces including the airway aperture extending generally centrally therethrough.

3. The candle blowing apparatus of claim 1, wherein the filter has a substantially flat first surface and a parallel and substantially flat second surface, and wherein the at least one flange is configured to be disposed adjacent and substantially parallel to the first or second surface of the filter.

4. The candle blowing apparatus of claim 3, wherein the support structure includes a plurality of flanges.

5. The candle blowing apparatus of claim 4, wherein the flanges are connected with one another via a ring.

6. The candle blowing apparatus of claim 5, wherein the ring includes an aperture therethrough.

7. The candle blowing apparatus of claim 6, wherein the ring is oriented substantially in parallel to the first and second surfaces of the filter.

8. The candle blowing apparatus of claim 7, wherein the airflow path runs between each of the plurality of flanges and through the aperture of the ring.

9. The candle blowing apparatus of claim 1, wherein the shelf of the main housing is an annular ledge extending along an entire circumference of the interior surface of the main housing.

10. The candle blowing apparatus of claim 9, wherein the shelf and the support structure both support the filter.

11. The candle blowing apparatus of claim 1, wherein the airway aperture of the end cap is disposed substantially inline with the airflow path between the mouthpiece and through the end cap.

12. The candle blowing apparatus of claim 11, wherein the end cap includes a cylindrical tube disposed adjacent to the airway aperture of the end cap, the cylindrical tube having an opening therethrough that is substantially inline with the airway aperture of the end cap.

13. The candle blowing apparatus of claim 12, wherein the cylindrical tube of the end cap includes an inner protrusion configured to extend towards the support structure when the end cap is attached to the second end of the main housing, and wherein the protrusion is configured to retain the filter in the main housing.

14. The candle blowing apparatus of claim 13, wherein the end cap includes an outer protrusion extending towards the support structure when the end cap is attached to the second end of the main housing.

15. The candle blowing apparatus of claim 14, wherein the inner protrusion and the outer protrusion both contact and support the filter.

16. The candle blowing apparatus of claim 14, wherein the inner protrusion includes a plurality of fingers configured to contact and support the filter, the plurality of fingers extending from an interior surface of the end cap.

17. The candle blowing apparatus of claim 16, wherein the outer protrusion is an annular wall extending from the interior surface of the end cap, and wherein the outer protrusion surrounds the cylindrical tube and each of the plurality of fingers.

18. The candle blowing apparatus of claim 17, wherein the cylindrical tube and each of the plurality of fingers are spaced apart from the outer protrusion along the interior surface of the end cap.

19. A kit for a candle blowing apparatus for extinguishing a candle, the kit comprising:
a generally hollow main housing having a first end, a second end, and an interior surface defining an airflow path through the main housing, wherein the second end includes a first opening therethrough, wherein the interior surface near the second end of the main housing includes a shelf extending along the interior surface, the shelf being disposed a distance away from the second end and having a second opening therethrough, and wherein a diameter of the second opening of the shelf is less than a diameter of the first opening of the second end of the main housing;
a mouthpiece coupled to the first end of the main housing;
a filter configured to be removably disposed within the main housing between the shelf and the second end of the main housing so that the filter is in fluid communication with the mouthpiece;
a support structure having at least one flange configured to partially obstruct the second opening of the shelf, wherein the at least one flange is configured to extend orthogonally to the airflow path through the main housing, and wherein the at least one flange is configured to support the filter when the filter is disposed within the main housing; and
an end cap configured to be removably coupled to the second end of the main housing so that the end cap is in fluid communication with the filter when the filter is disposed within the main housing, the end cap is configured to entirely cover the first opening of the main housing, wherein the end cap is configured to contact the filter for securing the filter against the shelf of the main housing or the at least one flange of the support structure, and wherein the end cap together with the mouthpiece and the filter define the airflow path for delivery of an extinguishing gust of air to the candle when the end cap is coupled to the second end of the main housing and the filter is disposed within the main housing.

20. A method of extinguishing a candle, the method comprising:
providing a kit for a candle blowing apparatus, the kit including:
a generally hollow main housing having a first end, a second end, and an interior surface defining an airflow path through the main housing, wherein the second end includes a first opening therethrough, wherein the interior surface near the second end of the main housing includes a shelf extending along the interior surface, the shelf being disposed a distance away from the second end and having a second opening therethrough, and wherein a diameter of the second opening of the shelf is less than a diameter of the first opening of the second end of the main housing;
a mouthpiece coupled to the first end of the main housing;
a filter configured to be removably disposed within the main housing between the shelf and the second end of the main housing so that the filter is in fluid communication with the mouthpiece;
a support structure having at least one flange configured to partially obstruct the second opening of the shelf, wherein the at least one flange is configured to extend orthogonally to the airflow path through the main housing, and wherein the at least one flange is configured to support the filter when the filter is disposed within the main housing; and
an end cap configured to be removably coupled to the second end of the main housing so that the end cap is in fluid communication with the filter when the filter is disposed within the main housing, the end cap is configured to entirely cover the first opening of the main housing, wherein the end cap is configured to contact the filter for securing the filter against the shelf of the main housing or the at least one flange of the support structure, and wherein the end cap together with the mouthpiece and the filter define the airflow path for delivery of an extinguishing gust of air to the candle when the end cap is coupled to the second end of the main housing and the filter is disposed within the main housing;
disposing the filter within the main housing between the shelf and the second end of the main housing;
coupling the end cap to the second end of the main housing, whereby the candle blowing apparatus is assembled;
orienting the candle blowing apparatus toward the candle; and blowing through the mouthpiece to extinguish the candle in a hygienic manner.

\* \* \* \* \*